US009164291B2

(12) United States Patent
Yasui

(10) Patent No.: US 9,164,291 B2
(45) Date of Patent: Oct. 20, 2015

(54) OPTICAL SYSTEM INCLUDING DIFFRACTIVE OPTICAL ELEMENT AND OPTICAL APPARATUS

(71) Applicant: CANON KABUSHIKI KAISHA, Tokyo (JP)

(72) Inventor: Hiroto Yasui, Saitama (JP)

(73) Assignee: CANON KABUSHIKI KAISHA (JP)

( * ) Notice: Subject to any disclaimer, the term of this patent is extended or adjusted under 35 U.S.C. 154(b) by 0 days.

(21) Appl. No.: 14/317,820

(22) Filed: Jun. 27, 2014

(65) Prior Publication Data
US 2015/0002939 A1    Jan. 1, 2015

(30) Foreign Application Priority Data

Jun. 28, 2013    (JP) .................................. 2013-136307

(51) Int. Cl.
G02B 15/00    (2006.01)
G02B 15/14    (2006.01)
G02B 27/42    (2006.01)

(52) U.S. Cl.
CPC ............ *G02B 27/4211* (2013.01); *G02B 15/00* (2013.01); *G02B 15/14* (2013.01)

(58) Field of Classification Search
CPC ................................. G02B 15/00; G02B 15/14
USPC .................................. 359/793–795, 691, 692
See application file for complete search history.

(56) References Cited

U.S. PATENT DOCUMENTS

2008/0088950 A1*   4/2008   Endo ............................. 359/785
2012/0229921 A1*   9/2012   Eguchi .......................... 359/771

FOREIGN PATENT DOCUMENTS

JP    06324262 A    11/1994

OTHER PUBLICATIONS

Ohara. S-TIH53 [online]. Ohara, Oct. 22, 2006 [retrieved on Mar. 16, 2015]. Retrieved from the internet: https://web.archive.org/web/20061022015646/http://www.oharacorp.com/pdf/estih53.pdf.*

(Continued)

*Primary Examiner* — Thomas K Pham
*Assistant Examiner* — Mitchell Oestreich
(74) *Attorney, Agent, or Firm* — Rossi, Kimms & McDowell LLP

(57) ABSTRACT

The optical system includes, in order from an object side, a front lens unit LF, an aperture stop S, a rear lens unit LR. The front lens unit includes a diffraction optical element Ldoe. A stop side positive lens Lsp disposed closest to the aperture stop among the rear lens unit satisfies $1.55 \leq Nd_{sp} \leq 1.70$, $30.0 \leq vd_{sp} \leq 50.0$, and $5.0 \times 10^{-4} \leq \Delta\theta dC_{sp} \leq 5.0 \times 10^{-3}$. $Nd_{sp}$ and $vd_{sp}$ repectively represent a refractive index and an Abbe number of the stop side positive lens for a d-line, and $\Delta\theta dC_{sp}$ is represents a value defined by $\Delta\theta dC_{sp} = \theta dC_{sp} - (-0.17041 \times \theta gd_{sp} + 0.513577)$ where $Ng_{sp}$, $NC_{sp}$ and $NF_{sp}$ respectively represent refractive indices of the stop side positive lens for a g-line, a C-line and an F-line. $\theta dC_{sp}$ and $\theta gd_{sp}$ are respectively defined by $\theta dC_{sp} = (Nd_{sp} - NC_{sp})/(NF_{sp} - NC_{sp})$ and $\theta gd_{sp} = (Ng_{sp} - Nd_{sp})/(NF_{sp} - NC_{sp})$.

10 Claims, 9 Drawing Sheets

(56) References Cited

OTHER PUBLICATIONS

Ohara. S-TIL25 [online]. Ohara, Oct. 22, 2006 [retrieved on Mar. 16, 2015]. Retrieved from the internet: https://web.archive.org/web/20061022015958/http://www.oharacorp.com/pdf/estil25.pdf.*

* cited by examiner

OPTICAL SYSTEM INCLUDING DIFFRACTIVE OPTICAL ELEMENT AND OPTICAL APPARATUS

BACKGROUND OF THE INVENTION

1. Field of the Invention

The present invention relates to an optical system including a diffractive optical element, the optical system being suitable to optical apparatuses, such as a still camera, a video camera and an interchangeable lens.

2. Description of the Related Art

For such optical systems, reduction in size (total length) and weight of the whole optical system tends to increase various kinds of aberrations, especially longitudinal (axial) chromatic aberration and chromatic aberration of magnification, and thereby to degrade optical performance of the optical system. For a telephoto optical system having a shortened total length in particular, a longer focal length leads to increased chromatic aberration. A known technique to reduce such chromatic aberration is to use a diffractive optical element disposed in the optical system. This technique can achieve a high achromatic effect, which cannot be achieved with a normal optical glass material, by utilizing a negative dispersion property and a high anomalous partial dispersion property of the diffractive optical element, which are different from the properties of normal glass materials.

The shortened total length of the optical system potentially results in increase in aberrations other than chromatic aberration. For example, an optical system of a typical telephoto lens includes, in order from an object side to an image side, a front lens unit having a positive refractive power, an aperture stop and a rear lens unit having a negative refractive power. For such an optical system, reduction in the total length of the optical system tends to require a larger power of the front lens unit, which results in a positive Petzval sum. This causes a problem that an image surface of the optical system excessively tilts to an under side.

Japanese Patent Laid-open No. 06-324262 discloses an optical system of a telephoto lens having a shortened total length by using the diffractive optical element. This optical system includes a diffractive optical element to correct, among chromatic aberrations increased with a shortened entire length of the optical system, a chromatic aberration for a g-line that cannot be corrected only with a normal achromatic condition specifying use of a low dispersive optical material and a highly dispersive optical material. The diffractive optical element has a high anomalous partial dispersion ($\theta gF=0.296$) as described above, so that it is effective in correcting the chromatic aberration for the g-line. Also the diffractive optical element has an absolute value of a value corresponding to an Abbe number as small as 3.453 so that it can correct chromatic aberration with a small refractive power caused by diffraction and little influence on spherical aberration, coma, astigmatism and the like.

To sufficiently correct chromatic aberration over the entire visible wavelength range, chromatic aberrations for wavelengths of d-, g-, C- and F-lines need to be removed. However, the configuration including the diffractive optical element disclosed in Japanese Patent Laid-open No. 06-324262 allows a relatively sufficient correction of the chromatic aberrations for three wavelengths among the d-, g-, C- and F-lines, but has difficulties in simultaneously correcting the chromatic aberration for the g-line and chromatic aberration for a wavelength range from the F-line to the C-line (especially the C-line). This is because the diffractive optical element causes chromatic aberration varying proportionally with wavelength. The chromatic aberration caused by the diffractive optical element and the wavelength are proportionally related to each other, and a gradient of the chromatic aberration for the wavelength range from the F-line to the C-line is the same as that of the chromatic aberration for a wavelength range from the g-line to the F-line.

In contrast, chromatic aberration caused in a typical optical material varies curvilinearly with wavelength, with a tendency of a larger curvature gradient for a shorter wave length. Therefore, the gradient of the chromatic aberration for the wavelength range from the F-line and the C-line differs from that of the chromatic aberration for the wavelength range from the g-line to the F-line. Thus, when the chromatic aberration caused in the typical optical material is corrected with a diffractive optical element, giving a refractive power to the diffractive optical element to correct the chromatic aberration for the wavelength range from the g-line to the F-line leaves the chromatic aberration for the wavelength range from the F-line to the C-line uncorrected. In an opposite manner, giving a refractive power to the diffractive optical element to correct the chromatic aberration for the wavelength range from the F-line to the C-line leaves the chromatic aberration for the wavelength range from the g-line to the F-line uncorrected. As described above, the use of the diffractive optical element has difficulties in simultaneously and sufficiently correcting the chromatic aberration for the g-line and the chromatic aberration for the C-line.

In addition, Japanese Patent Laid-open No. 06-324262 only discloses chromatic aberration as aberration increased with a shortened entire optical system length and a method of correcting the chromatic aberration. However, consideration should be made on increase in aberrations other than the chromatic aberration, especially increase in field curvature (excessive tilt of the image surface to the under side).

SUMMARY OF THE INVENTION

The present invention provides a compact and light optical system capable of sufficiently correcting chromatic aberration and other aberrations (field curvature, for example) over the entire visible wavelength range.

The present invention provides as one aspect thereof an optical system including, in order from an object side to an image side, a front lens unit, an aperture stop and a rear lens unit. The front lens unit includes a diffractive optical element, and the rear lens unit includes at least one positive lens. Among the at least one positive lens, a stop side positive lens disposed closest to the aperture stop is formed of an optical material satisfying the following conditions:

$$1.55 \leq Nd_{sp} \leq 1.70$$

$$30.0 \leq vd_{sp} \leq 50.0$$

$$5.0 \times 10^{-4} \leq \Delta\theta dC_{sp} \leq 5.0 \times 10^{-3}.$$

In the above conditions, $Nd_{sp}$ and $vd_{sp}$ respectively represent a refractive index and an Abbe number of the optical material of the stop side positive lens for a d-line, and $\Delta\theta dC_{sp}$ represents a value defined by $$\Delta\theta dC_{sp} = \theta dC_{sp} - (-0.17041 \times \theta gd_{sp} + 0.513577)$$

where $Ng_{sp}$, $NC_{sp}$, and $NF_{sp}$ respectively represent refractive indices of the optical material of the stop side positive lens for a g-line, a C-line and an F-line, and $\theta dC_{sp}$ and $\theta gd_{sp}$ are respectively defined by $$\theta dC_{sp} = (Nd_{sp} - NC_{sp})/(NF_{sp} - NC_{sp}) \text{ and}$$

$$\theta gd_{sp}=(N_{gsp}-Nd_{sp})/(NF_{sp}-NC_{sp}).$$

The present invention provides as another aspect thereof an optical apparatus including a body, and the above optical system housed in the body.

Other aspects of the present invention will become apparent from the following description and the attached drawings.

DESCRIPTION OF THE EMBODIMENTS

Figure 1:
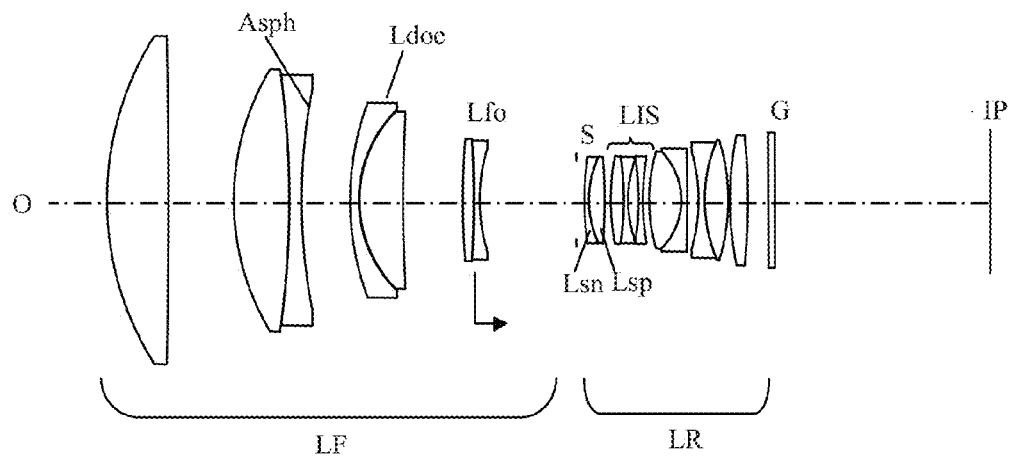
FIG. 1 is a cross-sectional view illustrating a telephoto lens of Embodiment 1 of the present invention.

Exemplary embodiments of the present invention will be described below with reference to the accompanied drawings. First, prior to description of specific embodiments of the present invention, common features in the embodiments will be described. An optical system of each of the embodiments is an optical system for a telephoto lens, including a front lens unit, an aperture stop and a rear lens unit in order from an object side to an image side. The front lens unit includes at least one diffractive optical element. The rear lens unit includes at least one positive lens. Among the at least one positive lens, one positive lens disposed closest to the aperture stop is formed of an anomalous partial dispersive glass material, which is an optical material having a particular material property. In the following description, the positive lens disposed closest to the aperture stop is referred to as "a rear stop side positive lens."

Employing such a lens configuration allows a compact and light telephoto lens whose chromatic aberration and other aberrations (especially, field curvature) are sufficiently corrected over the entire visible wavelength range.

The optical material of the rear stop side positive lens satisfies the following conditions (1), (2) and (3):

$$1.55 \leq Nd_{sp} \leq 1.70 \tag{1}$$

$$30.0 \leq vd_{sp} \leq 50.0 \tag{2}$$

$$5.0\times10^{-4} \leq \Delta\theta dC_{sp} \leq 5.0\times10^{-3} \tag{3}$$

where $Nd_{sp}$ and $vd_{sp}$ respectively represent a refractive index and an Abbe number of the optical material of the rear stop side positive lens for a d-line. Moreover, $\Delta\theta dC_{sp}$ represents a value defined by $$\Delta\theta dC_{sp}=\theta dC_{sp}-(-0.17041\times\theta gd_{sp}+0.513577).$$

In the expression, $\theta dC_{sp}$ and $\theta gd_{sp}$ are respectively defined by $$\theta dC_{sp}=(Nd_{sp}-NC_{sp})/(NF_{sp}-NC_{sp}) \text{ and }$$

$$\theta gd_{sp}=(Ng_{sp}-Nd_{sp})/(NF_{sp}-NC_{sp})$$

where $Ng_{sp}$, $NC_{sp}$ and $NF_{sp}$ respectively represents refractive indices of the optical material of the rear stop side positive lens for a g-line, a C-line and an F-line.

Conditions (1) to (3) limit the range of the optical material of the rear stop side positive lens. Specifically, condition (1) limits the range of the refractive index for the d-line, condition (2) limits the range of the Abbe number for the d-line, and condition (3) limits the relation between $\theta dC$ and $\theta gd$.

A higher value of $Nd_{sp}$ than the upper limit of condition (1) increases the refractive index of the optical material of the rear stop side positive lens and accordingly provides a low Abbe number (that is, a high dispersion) in the range of existing glass materials. This is desirable in terms of sufficiently correcting a first-order chromatic aberration (especially, longitudinal chromatic aberration) at wavelengths other than the C-line and of making a Petzval sum of the whole optical system close to 0. However, the property of a typical existing glass material is such that a glass material having a high refractive index and a low Abbe number tends to have a low value of $\theta dC_{sp}$, which undesirably increases a chromatic aberration for the C-line. In contrast, a lower value of $Nd_{sp}$ than the lower limit of condition (1) decreases the refractive index of the optical material of the rear stop side positive lens and thereby excessively increases a Petzval value of the rear stop side positive lens, which is undesirble. Furthermore, this undesirably causes the image surface of the optical system to tilt to an under side.

A higher value of $vd_{sp}$ than the upper limit of condition (2) excessively increases the Abbe number (that is, excessively decreases the dispersion) of the optical material of the rear stop side positive lens, which undesirably makes it difficult to correct the chromatic aberration over the entire visible wavelength range. In contrast, a lower value of $vd_{sp}$ than the lower limit of condition (2) excessively decreases the Abbe number (that is, excessively increases the dispersion) of the optical material of the rear stop side positive lens. Similarly to condition (1), a glass material having a low Abbe number tends to have a low value of $\theta dC_{sp}$, which undesirably increases the chromatic aberration for the C-line.

Condition (3) is a condition to enable the rear stop side positive lens having the anomalous partial dispersion property to compensate a chromatic aberration for a wavelength range from the F-line to the C-line (hereinafter simply referred to as "an F-C-line") that increases when the diffractive optical element provided in the front lens unit removes a chromatic aberration for the g-line. This condition (3) will be described with reference to FIG. 9. A "chromatic aberration coefficient" in the following description is a coefficient of a low-order (first-order) term particularly representing, in an expansion expressing aberrations of the optical system, chromatic aberration; the chromatic aberration coefficient includes coefficients respectively corresponding to longitudinal chromatic aberration and chromatic aberration of magnification. The coefficient of longitudinal chromatic aberration (hereinafter referred to as "a longitudinal chromatic aberration coefficient") and the coefficient of chromatic aberration of magnification (hereinafter referred to as "a magnification chromatic aberration coefficient") each have wavelength dependancy. An "optical axis" is an optical axis of the telephoto lens as the whole optical system.

When the chromatic aberration coefficients for the F-C-line are made equal to each other and the coefficient of chromatic aberration for the g-line is corrected, the longitudinal chromatic aberration coefficient for a wavelength range from the d-line to the C-line (hereinafter simply referred to as "a d-C-line") is expressed by $$\frac{\phi}{v_d}\Delta\theta_{dC}h^2$$

and the magnification chromatic aberration coefficient is expressed by $$\frac{\phi}{v_d}\Delta\theta_{dC}h\bar{h}$$

where $\phi$ represents a refractive power (an inverse of a focal length) of the rear stop side positive lens, h represents a height of an axial paraxial ray entering the rear stop side positive lens measured at an entrance surface of the rear stop side positive lens from the optical axis. In addition, h-bar represents a height of a paraxial chief ray entering the rear stop side positive lens.

Figure 9:
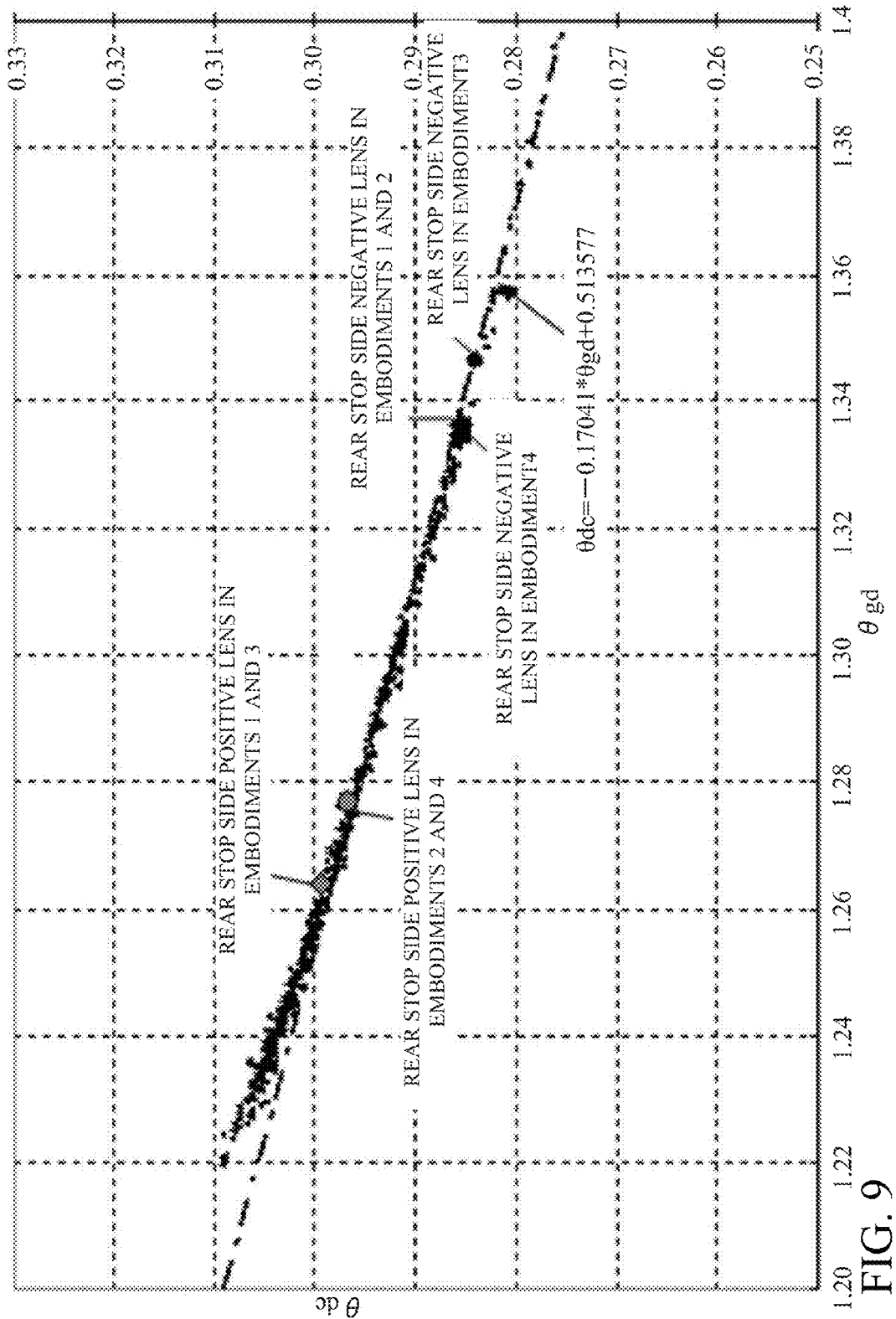
FIG. 9 is a graph showing a refractive index property ($\theta dC$-$\theta gd$ property) of an optical material used for a stop side positive lens and a stop side negative lens in each of the embodiments.

The axial paraxial ray is a paraxial ray of light that has a height of 1 from the optical axis and enters the optical system in parallel to the optical axis thereof when a focal length of the whole optical system is normalized to 1. The paraxial chief ray is a paraxial ray passing through an intersection of an entrance pupil of the optical system with the optical axis among light rays whose incident angle is −45° with respect to the optical axis when the focal length of the whole optical system is normalized to 1. In the following description, an incident angle to the optical system is taken to be positive in the clockwise direction and negative in the anticlockwise direction. The expression below that defines $\Delta\theta dC$, $$\Delta\theta dC_{sp} = \theta dC_{sp} - (-0.17041 \times \theta g d_{sp} + 0.513577)$$

is an expression representing the relation between $\theta dC$ and $\theta gd$ of the optical material of the rear stop side positive lens. The relation is illustrated in FIG. 9. In FIG. 9, the vertical axis represents $\theta dC$, and the horizontal axis represents $\theta gd$.

Values of $\Delta\theta dC_{sp}$, which are not given in FIG. 9, can be each calculated by subtracting the value of $(-0.17041 \times \theta g d_{sp} + 0.513577)$ from the value of $\theta dC_{sp}$ of material physical properties $(\theta g d_{sp}, \theta dC_{sp})$ of the optical material. That is, $\Delta\theta dC_{sp}$ is a value indicating which region above or below the straight line of $(-0.17041 \times \theta g d + 0.513577)$, on which typical glass materials are distributed, the value of $\theta dC$ of the optical material is included in and how far the value of $\theta dC$ is from the line.

As clear from FIG. 9, the glass material as the optical material of the rear stop side positive lens is included in the region above the straight line representing the distribution of the typical glass materials. The glass material included in this region is employed for the following reasons. The optical system of each of the embodiments is, as described above, an optical system for a telephoto lens including a diffractive optical element. The diffractive optical element is disposed in the front lens unit on the object side further than the aperture stop and has a positive refractive power. The chromatic aberration for the F-C-line that increases when the diffractive optical element removes the chromatic aberration for the g-line needs to be compensated by the rear stop side positive lens having an anomalous partial dispersion property. Description will be made of the relation in this compensation with the longitudinal chromatic aberration coefficient. When $\phi_{doe}$ represents a refractive power of a diffractive surface of the diffractive optical element, $vd_{doe}$ represents an Abbe number of the diffractive optical element, and $\Delta\theta_{doe-dC}$ represents the value of condition (3), signs of these values are $\phi_{doe} > 0$, $vd_{doe} < 0$, and $\Delta\theta_{doe-dC} > 0$. The diffractive optical element therefore has the longitudinal chromatic aberration coefficient shown below:

$$\frac{\phi_{doe}}{vd_{doe}}\Delta\theta_{doe-dC}h^2 < 0.$$

To compensate the longitudinal chromatic aberration, the rear stop side positive lens needs to have the longitudinal chromatic aberration coefficient shown below:

$$\frac{\phi_{sp}}{vd_{sp}}\Delta\theta dc_{sp}h^2 > 0.$$

Since $\phi_{sp}$ and $vd_{sp}$ are positive, the remaining $\Delta\theta dc_{sp}$ needs to be positive necessarily.

For those reasons, a glass material used as the optical material of the rear stop side positive lens needs to be one included in the region above the straight line representing the distribution of the typical glass materials. A higher value of $\Delta\theta dC_{sp}$ than the upper limit of condition (3) causes the value of $\theta dc_{sp}$ to be excessively away upward in FIG. 9 from the value calculated by $(-0.17041 \times \theta g d_{sp} + 0.513577)$. This is desirable in terms of correcting aberration, but undesirable because no glass material having such a property exists. In contrast, a lower value of $\Delta\theta dC_{sp}$ than the lower limit of condition (3) causes the value of $\theta dc_{sp}$ to be excessively close to the value calculated by $(-0.17041 \times \theta g d_{sp} + 0.513577)$ and thereby decreases a correction effect of the chromatic aberrations for the g-line and for the F-C-line, which is undesirable.

It is desirable that the numerical ranges of conditions (1) to (3) be set as below:

$$1.58 \leq Nd_{sp} \leq 1.68 \tag{1-1}$$

$$35.0 \leq vd_{sp} \leq 48.0 \tag{2-1}$$

$$5.50 \times 10^{-4} \leq \Delta\theta dC_{sp} \leq 4.00 \times 10^{-3} \tag{3-1}$$

It is more desirable that the numerical ranges of conditions (1) to (3) be set as below:

$$1.59 \leq Nd_{sp} \leq 1.67 \quad (1\text{-}2)$$

$$37.0 \leq \nu d_{sp} \leq 46.0 \quad (2\text{-}2)$$

$$6.00 \times 10^{-4} \leq \Delta\theta dC_{sp} \leq 3.00 \times 10^{-3} \quad (3\text{-}2).$$

The optical system of each of the embodiments satisfies not only conditions (1) to (3), but also the following conditions (4) and (5). It is desirable that at least one of conditions (4) and (5) be satisfied.

$$0.10 \leq (f_{sp}/L_{sp\text{-}img})/(L_{tot}/f) \leq 1.00 \quad (4)$$

$$10.0 \leq |h_{sp}/hb_{sp}| \leq 15.0 \quad (5)$$

where f represents a focal length of the whole optical system in an in-focus state on an object at infinity, $f_{sp}$ represents a focal length of the rear stop side positive lens in air, and $L_{tot}$ represents a total optical length of the whole optical system in the in-focus state on the object at infinity; the total optical length is a distance on the optical axis from a lens surface closest to the object (most object side lens surface) to the image surface of the optical system. Moreover, $L_{sp\text{-}img}$ represents a distance on the optical axis from an object side lens surface of the rear stop side positive lens to the image surface of the optical system. Furthermore, $h_{sp}$ represents a height of the axial paraxial ray entering the rear stop side positive lens measured at the entrance surface of the rear stop side positive lens from the optical axis, and $hb_{sp}$ represents a height of the paraxial chief ray entering the rear stop side positive lens measured at the entrance surface of the rear stop side positive lens from the optical axis.

Condition (4) limits the relation between the refractive power of the rear stop side positive lens and the total optical length of the optical system. A higher value of $(f_{sp}/L_{sp\text{-}img})/(L_{tot}/f)$ than the upper limit of the condition (4) excessively decreases the refractive power of the rear stop side positive lens and thereby makes it impossible to correct the chromatic aberration for the F-C-line generated at the diffractive surface of the diffractive optical element disposed in the front lens unit, which is undesirable. In contrast, a lower value of $(f_{sp}/L_{sp\text{-}img})/(L_{tot}/f)$ than the lower limit of the condition (4) excessively increases the refractive power of the rear stop side positive lens, which causes excessive correction of the chromatic aberration for the F-C-line generated at the diffractive surface and thereby undesirably causes increase in the chromatic aberration for the F-C-line. This also increases the Petzval sum of the whole optical system, and thereby the image surface is excessively tilted toward the under side, which is undesirable.

It is desirable in terms of correcting chromatic aberration and field curvature that the numerical range of condition (4) be set as below:

$$0.20 \leq (f_{sp}/L_{sp\text{-}img})/(L_{tot}/f) \leq 0.90 \quad (4\text{-}1).$$

It is more desirable that the numerical range of condition (4) be set as below:

$$0.30 \leq (f_{sp}/L_{sp\text{-}img})/(L_{tot}/f) \leq 0.70 \quad (4\text{-}2).$$

Condition (5) limits the position of the rear stop side positive lens in the rear lens unit. A higher value of $|h_{sp}/hb_{sp}|$ than the upper limit of condition (5) causes the position of the rear stop side positive lens to be excessively away from the aperture stop to the image side, which undesirably makes correction of chromatic aberration difficult. In contrast, a lower value of $|h_{sp}/hb_{sp}|$ than the lower limit of condition (5) causes the position of the rear stop side positive lens to be closer to the aperture stop, which desirably facilitates correction of longitudinal chromatic aberration. However, such a configuration undesirably makes it difficult to dispose, near the aperture stop, a mechanism for operating the aperture stop in its opening/closing direction and a mechanism for driving a focus lens.

It is desirable in terms of correcting the longitudinal chromatic aberration for the F-C-line generated at the diffractive surface of the diffractive optical element in the front lens unit that the numerical range of condition (5) be set as below:

$$11.0 \leq |h_{sp}/hb_{sp}| \leq 14.5 \quad (5\text{-}1).$$

It is more desirable that the numerical range of condition (5) be set as below:

$$12.0 \leq |h_{sp}/hb_{sp}| \leq 14.0 \quad (5\text{-}2).$$

The conditions described above are conditions for the rear stop side positive lens.

In the optical system of each of the embodiments, the rear lens unit further includes at least one negative lens. Among the at least one negative lens, a negative lens disposed closest to the aperture stop is also formed of an anomalous partial dispersive glass material, which is an optical material having a particular material property. In the following description, the negative lens disposed closest to the aperture stop is referred to as "a rear stop side negative lens."

It is desirable in terms of correcting the chromatic aberration and the field curvature that not only the rear stop side positive lens satisfy conditions (1) to (3), but also the rear stop side negative lens satisfy at least one of the following conditions (6) to (10):

$$1.75 \leq Nd_{sn} \leq 1.95 \quad (6)$$

$$15.0 \leq \nu d_{sn} \leq 30.0 \quad (7)$$

$$-1.00 \times 10^{-3} \leq \Delta\theta dC_{sn} \leq -1.00 \times 10^{-6} \quad (8)$$

where $Nd_{sn}$ and $\nu d_{sn}$ respectively represent a refractive index and an Abbe number of the optical material of the rear stop side negative lens for the d-line, and $\Delta\theta dC_{sn}$ represents a value defined by $$\Delta\theta dC_{sn} = \theta dC_{sn} - (-0.17041 \times \theta g d_{sn} + 0.513577).$$

In this expression, when $Ng_{sn}$, $NC_{sn}$ and $NF_{sn}$ respectively represent refractive indices of the optical material of the rear stop side negative lens for the g-, C- and F-lines, $\theta dC_{sn}$ and $\theta g d_{sn}$ are given by $$\theta dC_{sn} = (Nd_{sn} - NC_{sn})/(NF_{sn} - NC_{sn}) \text{ and}$$

$$\theta g d_{sn} = (Ng_{sn} - Nd_{sn})/(NF_{sn} - NC_{sn}).$$

$$0.10 \leq |(f_{sn}/L_{sn\text{-}img})/(L_{tot}/f)| \leq 1.00 \quad (9)$$

where f represents the focal length of the whole optical system in the in-infocus state on the object at infinity, $f_{sn}$ represents a focal length of the rear stop side negative lens in air, $L_{tot}$ represents the total optical length of the whole optical system in the in-focus state on the object at infinity, and $L_{sn\text{-}img}$ represents a distance on the optical axis from an object side lens surface of the rear stop side negative lens to the image surface of the optical system.

$$1.00 \leq |(Nd_{sn} \times f_{sn})/(Nd_{sp} \times f_{sp})| \leq 2.00 \quad (10)$$

where $f_{sn}$ represents, as described above, the focal length of the rear stop side negative lens in air, and $f_{sp}$ represents, as described above, the focal length of the rear stop side positive lens in air.

Conditions (6) to (8) limit the range of the optical material of the rear stop side negative lens. Specifically, condition (6)

limits the range of a refractive index of the optical material for the d-line, condition (7) limits the range of an Abbe number of the optical material for the d-line, and condition (8) limits the relation between θdC and θgd.

A higher value of $Nd_{sn}$ than the upper limit of condition (6) excessively increases the refractive index of the optical material of the rear stop side negative lens, and thus the Petzval value generated at the rear stop side positive lens cannot be completely compensated, which undesirably leaves a large positive Petzval sum of the whole optical system. Furthermore, such a lrage positive Petzval sum causes excessive tilt of the image surface toward the under side. In contrast, a lower value of $Nd_{sn}$ than the lower limit of condition (6) decreases the refractive index of the optical material of the rear stop side negative lens, and thereby the Abbe number thereof is high (the dispersion is low) in the range of existing glass materials. This undesirably makes it difficult to correct the chromatic aberration over the entire visible wavelength range.

A higher value of $vd_{sn}$ than the upper limit of condition (7) excessively increases the Abbe number (that is, excessively decreases the dispersion) of the optical material of the rear stop side negative lens, which undesirably makes it difficult to correct the chromatic aberration over the entire visible wavelength range. In contrast, a lower value of $vd_{sn}$ than the lower limit of condition (7) excessively decreases the Abbe number (that is, excessively increases the dispersion) of the optical material of the rear stop side negative lens, and thereby the refractive index thereof is too high in the range of existing glass materials. Such a too high refractive index of the optical material of the rear stop side negative lens makes it impossible to completely compensate the Petzval value generated at the rear stop side positive lens, which undesireably leaves a large positive Petzval sum of the whole optical system. Furthermore, such a lrage positive Petzval sum causes excessive tilt of the image surface toward the under side.

Condition (8) is a condition for causing the rear stop side negative lens having the anomalous partial dispersion property to compensate the chromatic aberration for the F-C-line that increases when the diffractive optical element in the front lens unit removes the chromatic aberration for the g-line. Similarly to condition (3), condition (8) will be described with reference to FIG. 9.

In FIG. 9, condition (8) differs from condition (3) in that it is for the rear stop side negative lens and thus the glass material as the optical material of the rear stop side negative lens is included in the region below the straight line of $(-0.17041 \times \theta gd_{sn} + 0.513577)$ in FIG. 9.

The reason for this is as follows. In terms of the longitudinal chromatic aberration coefficient as well as condition (3), in order to compensate the longitudinal chromatic aberration generated at the diffractive surface of the diffractive optical element in the front lens unit, the longitudinal chromatic aberration coefficient of the rear stop side negative lens needs to satisfy the following condition:

$$\frac{\phi_{sn}}{vd_{sn}} \Delta\theta dc_{sn} h^2 > 0.$$

Since $\phi_{sn} < 0$ and $vd_{sn} > 0$, $\Delta\theta dc_{sn} < 0$ needs to be held to satisfy this condition on the longitudinal chromatic aberration coefficient. This indicates that the value of θdC of the optical material of the rear stop side negative lens is included in the region below the straight line in FIG. 9.

A higher value of $\Delta\theta dC_s$, than the upper limit of condition (8) causes the value of $\theta dc_s$, to be excessively close to the value calculated by $(-0.17041 \times \theta gd_{sn} + 0.513577)$, which undesirably decreases an effect of simultaneously correcting the chromatic aberrations for the g-line and for the F-C-line. In contrast, a lower value of $\Delta\theta dC_{sn}$ than the lower limit of condition (8) causes the value of $\theta dc_{sn}$ to be excessively away downward in FIG. 9 below the value calculated by $(-0.17041 \times \theta gd_{sn} + 0.513577)$, which is undesirable because no glass material has such a value.

It is desirable that the numerical ranges of conditions (6) to (8) be set as below:

$$1.77 \leq Nd_{sn} \leq 1.90 \tag{6-1}$$

$$17.0 \leq vd_{sn} \leq 28.0 \tag{7-1}$$

$$-0.90 \times 10^{-3} \leq \Delta\theta dC_{sn} \leq -1.50 \times 10^{-6} \tag{8-1}.$$

It is more desirable that the numerical ranges of conditions (6) to (8) be set as below:

$$1.79 \leq Nd_{sn} \leq 1.87 \tag{6-2}$$

$$20.0 \leq vd_{sn} \leq 25.0 \tag{7-2}$$

$$-0.70 \times 10^{-3} \leq \Delta\theta dC_{sn} \leq -2.00 \times 10^{-6} \tag{8-2}.$$

Condition (9) limits the relation between the refractive power of the rear stop side negative lens and the total optical length of the optical system. A higher value of $|(f_{sn}/L_{sn-img})/(L_{tot}/f)|$ than the upper limit of condition (9) excessively decreases the refractive power of the rear stop side negative lens and thereby undesirably makes it impossible to completely correct the chromatic aberration for the F-C-line generated at the diffractive surface of the diffractive optical element in the front lens unit. In contrast, a lower value of $|(f_{sn}/L_{sn-img})/(L_{tot}/f)|$ than the lower limit of condition (9) excessively increases the refractive power of the rear stop side negative lens and thereby excessively corrects the chromatic aberration for the F-C-line generated at the diffractive surface, which undesirably increases the chromatic aberration for the F-C-line. Furthermore, this excessively increases the Petzval sum, so that the image surface is undesirably tilted toward the under side.

It is desirable in terms of correcting the chromatic aberration and field curvature that the numerical range of condition (9) be set as below:

$$0.30 \leq |(f_{sn}/L_{sn-img})/(L_{tot}/f)| \leq 0.90 \tag{9-1}.$$

It is more desirable that the numerical range of condition (9) be set as below:

$$0.50 \leq |(f_{sn}/L_{sn-img})/(L_{tot}/f)| \leq 0.85 \tag{9-2}.$$

Condition (10) limits the relation of the refractive index and the refractive power (that is, the relation of the Petzval values) between the rear stop side positive lens and the rear stop side negative lens. A higher value of $|(Nd_{sn} \times f_{sn})/(Nd_{sp} \times f_{sp})|$ than the upper limit of condition (10) increases the optical material of the rear stop side negative lens, which makes it impossible to completely compensate the Petzval value generated at the rear stop side positive lens. Therefore, a large positive Petzval sum of the whole optical system is left, and thereby the image surface is undesirably excessively tilted toward the under side. In contrast, a lower value of $|(Nd_{sn} \times f_{sn})/(Nd_{sp} \times f_{sp})|$ than the lower limit of condition (10) decreases the refractive index of the optical material of the rear stop side positive lens and thereby increases the Petzval value thereof, which undireably leaves a large positive Petzval sum of the whole optical system. Furthermore, the image plane is thereby excessibly tilted toward the under side, which is undesirable.

It is desirable that the numerical range of condition (10) be set as follows to provide a good image surface property:

$$1.10 \leq |(Nd_{sn} \times f_{sn})/(Nd_{sp} \times f_{sp})| \leq 1.90 \quad (10^{-1}).$$

It is more desirable that the numerical range of condition (10) be set as below:

$$1.20 \leq |(Nd_{sn} \times f_{sn})/(Nd_{sp} \times f_{sp})| \leq 1.80 \quad (10^{-2}).$$

The conditions described above are conditions for the rear stop side negative lens.

In the description so far, the rear stop side positive lens and the rear stop side negative lens are each treated as a single lens, but these positive and negative lenses may be adjoined at their any optical surfaces to constitute a cemented lens.

It is desirable in terms of correcting the chromatic aberration that not only the rear stop side positive lens satisfy conditions (1) to (3) (desirably, the rear stop side negative lens satisfy conditions (4) to (8) as well), but also the diffractive surface of the diffractive optical element in the front lens unit satisfy the following conditions (11) and (12):

$$0.01 \leq f/f_{doe} \leq 0.10 \quad (11)$$

$$0.10 \leq |h_{doe}/hb_{doe}| \leq 1.5 \quad (12)$$

where f represents the focal length of the whole optical system in the in-focus state on the object at infinity, and $f_{doe}$ represents a focal length of the diffractive surface of the diffractive optical element. Moreover, $h_{doe}$ represents the height of the axial paraxial ray entering the diffractive surface of the diffractive optical element in the front lens unit measured at the diffractive surface from the optical axis, and $hb_{doe}$ represents the height of the paraxial chief ray entering the diffractive surface measured at the diffractive surface from the optical axis.

Condition (11) limits the range of the refractive power of the diffractive surface of the diffractive optical element, and condition (12) limits the position at which the diffractive surface is disposed in the front lens unit.

A higher value of $f/f_{doe}$ than the upper limit of condition (11) excessively increases the refractive power of the diffractive surface, which undesirably makes it impossible for the rear stop side positive lens and the rear unit stop side negative lens to completely compensate the chromatic aberration, especially the longitudinal chromatic aberration for the F-C-line, generated at the diffractive surface. Moreover, such an excessively increased refractive power of the diffractive surface undesirably makes a grating pitch of the diffractive optical element so fine as to increase flare attributable to the diffractive surface. In contrast, a lower value of $f/f_{doe}$ than the lower limit of condition (11) excessively decreases the refractive power of the diffractive surface, which undesirably causes insufficient correction of the chromatic aberration over the entire visible wavelength range.

A higher value of $|h_{doe}/hb_{doe}|$ than the upper limit of condition (12) makes the position of the diffractive surface too close to the aperture stop, which undesirably decreases an effect of correcting the chromatic aberration by the diffractive surface less. In contrast, a lower value of $|h_{doe}/hb_{doe}|$ than the lower limit of condition (12) moves the position of the diffractive surface further to the object side, which is undesirable in terms of dust proofing at manufacturing of the diffractive optical element.

It is desirable that the numerical range of conditions (11) and (12) be set as follows in terms of correcting the chromatic aberration at the diffractive surface.

$$0.015 \leq f/f_{doe} \leq 0.095 \quad (11\text{-}1)$$

$$0.20 \leq |h_{doe}/hb_{doe}| \leq 1.25 \quad (12\text{-}1)$$

It is more desirable that the numerical range of conditions (11) and (12) be set as below:

$$0.020 \leq f/f_{doe} \leq 0.090 \quad (11\text{-}2)$$

$$0.40 \leq |h_{doe}/hb_{doe}| \leq 1.00 \quad (12\text{-}2).$$

Next, description of specific embodiments of the present invention will be made. FIGS. 1, 3, 5 and 7 illustrates optical systems of a first embodiment (Embodiment 1), a second embodiment (Embodiment 2), a third embodiment (Embodiment 3) and a fourth embodiment (Embodiment 4), respectively. FIGS. 2, 4, 6 and 8 respectively illustrate various aberrations (spherical aberration, astigmatism, distortion and chromatic aberration of magnification) of the optical systems of Embodiment 1, Embodiment 2, Embodiment 3 and Embodiment in an in-focus state on an object at infinity (hereinafter referred to as "an infinite object").

In FIGS. 1, 3, 5 and 7, reference numeral S denotes an aperture stop, and reference numeral O denotes an optical axis. Reference numeral IP denotes an image surface, and reference numeral G denotes a glass block including an optical filter and the like. Reference numeral LF denotes a front lens unit disposed closer to an object side further than the aperture stop S, and reference numeral LR denotes a rear lens unit disposed on an image side further than the aperture stop S. Reference numeral Ldoe denotes a diffractive optical element having a diffractive surface, and reference numeral Asph denotes an aspheric surface. Reference numeral Lfo denotes a focus lens, and reference numeral LIS denotes an image stabilizing lens for correction of image blur caused by hand jiggling. Reference numeral Lsp denotes a rear stop side positive lens which is a most stop side positive lens disposed closest to the aperture stop S among at least one positive lens included in the rear lens unit LR. The reference numeral Lsn denotes a rear stop side negative lens which is a most stop side negative lens disposed closest to the aperture stop S among at least one negative lens included in the rear lens unit LR.

In FIGS. 2, 4, 6 and 8, a spherical aberration (d) for the d-line, a spherical aberration (g) for the g-line, an astigmatism (ΔS) of a sagittal ray for the d-line, an astigmatism (ΔM) of a meridional ray for the d-line and a chromatic aberration of magnification (g) for the g-line are illustrated. Fno represents an F-number, and ω represents a half angle of view.

Embodiment 1

The optical system of Embodiment 1 illustrated in FIG. 1 is an optical system for a super-telephoto lens having a focal length of 400 mm and an Fno of 4.0. The front lens unit LF has a positive refractive power, and the rear lens unit LR also has a positive refractive power. The diffractive optical element (diffractive surface) Ldoe is provided to a cemented surface of a cemented lens constituted by a fourth negative lens and a fifth positive lens in the front lens unit LF, which are counted from the object side. The diffractive surface has a positive refractive power.

The rear lens unit LR is constituted by the rear stop side negative lens Lsn, the rear stop side positive lens Lsp, and other positive and negative lenses, which are disposed in order from the object side to the image side. The rear stop side negative lens Lsn and the rear stop side positive lens Lsp constitute a cemented lens in which an image side surface of the rear stop side negative lens Lsn and an object side surface of the rear stop side positive lens Lsp are cemented to each other.

The optical materials of the rear stop side positive lens Lsp and the rear stop side negative lens Lsn are S-NBM51 and S-NPH53 (trade names by OHARA INC.), respectively. These optical materials (glass materials) satisfy conditions (1) to (3) and conditions (6) to (8), respectively. The optical materials listed here are merely examples, and other optical materials may be used as long as they satisfy conditions (1) to (3) and (6) to (8). This applies to the other embodiments to be described later.

The rear stop side positive lens Lsp and the rear stop side negative lens Lsn satisfy conditions (4) and (5), and conditions (9) and (10), respectively. These properties enable cancellation of a longitudinal chromatic aberration in the vicinity of the C-line generated at the diffractive surface of the diffractive optical element Ldoe and enable provision of a desired property for field curvature.

An image side surface of a third negative lens counted from the object side in the optical system is formed as the aspheric surface Asph. This aspheric surface allows correction of a high-order spherical aberration. The aspheric surface Asph is disposed relatively near the diffractive surface, enabling assisting an aspheric term of the diffractive surface.

Focusing on from the infinite object to a close distance object is performed by moving the focus lens (cemented lens) Lfo disposed closest to the image surface IP in the front lens unit LF to the image side.

The image stablising lens LIS in the rear lens unit LR is moved in a direction orthogonal to the optical axis O to correct (reduce) the image blur due to hand jiggling.

Although not illustrated in FIG. 1, another glass block may be disposed between the glass block G and the image surface IP. This also applies to the other embodiments.

Figure 2:
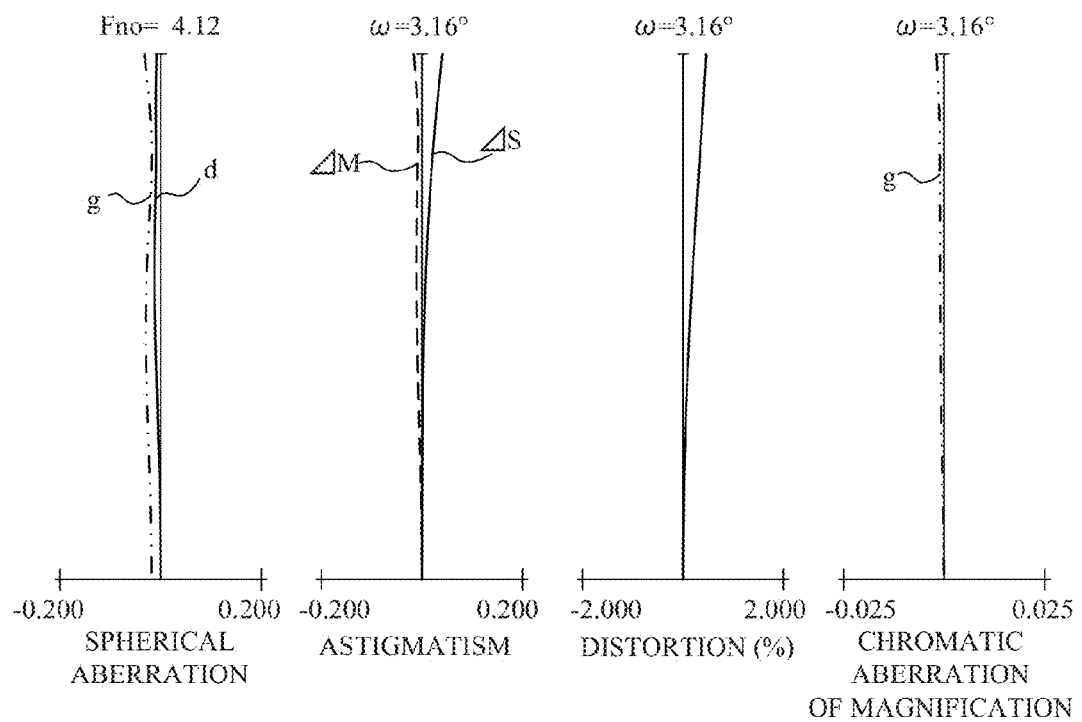
FIG. 2 is an aberration diagram of the telephoto lens of Embodiment 1.

The optical system configured as described above has sufficiently corrected aberrations, especially the chromatic aberration of magnification and the field curvature (astigmatism), as illustrated in FIG. 2.

The present embodiment achieves a compact and light optical system which includes the diffractive optical element and whose chromatic aberration and other aberrations (especially, field curvature) are sufficiently corrected over the entire visible wavelength range.

Embodiment 2

Figure 3:
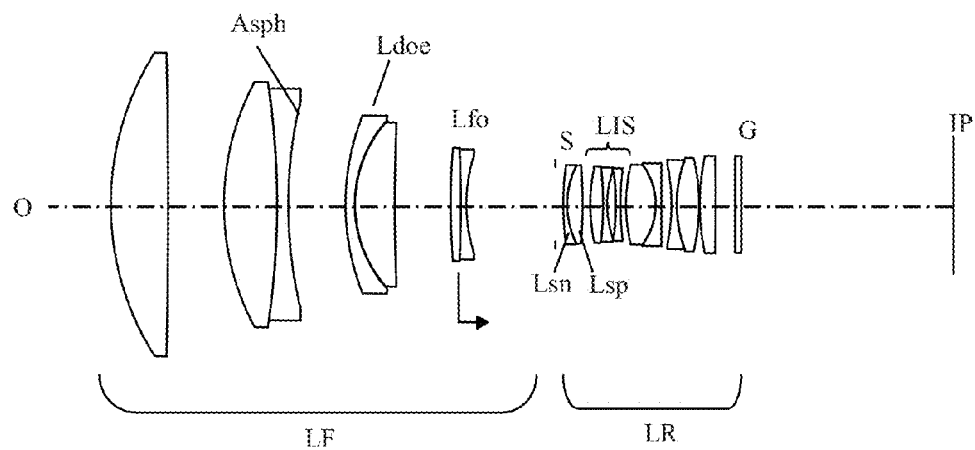
FIG. 3 is a cross-sectional view illustrating a telephoto lens of Embodiment 2 of the present invention.

An optical system of Embodiment 2 illustrated in FIG. 3 is an optical system for a super-telephoto lens having a focal length of 600 mm and an Fno of 4.0. Similarly to Embodiment 1, the front lens unit LF has a positive refractive power, and the rear lens unit LR also has a positive refractive power. The diffractive optical element Ldoe and the aspheric surface Asph are provided at the same positions as those in Embodiment. The diffractive surface of the diffractive optical element Ldoe has a positive refractive power as well as in Embodiment 1.

Similarly to Embodiment 1, the rear lens unit LR is constituted by the rear stop side negative lens Lsn, the rear stop side positive lens Lsp, and other positive and negative lenses, which are disposed in order from the object side to the image side. Similarly to Embodiment 1, the rear stop side negative lens Lsn and the rear stop side positive lens Lsp constitute a cemented lens. In addition, the focus lens (cemented lens) Lfo and the image stabilizing lens LIS are disposed at the same positions and moved in the same manners as those in Embodiment 1.

In the present embodiment, S-NPH53 is used as the optical material of the rear stop side negative lens Lsn as well as in Embodiment 1. On the other hand, S-NBH5 (trade name by OHARA INC.) is used as the optical material of the rear stop side positive lens Lsp, which is a difference from Embodiment 1. These optical materials (glass materials) satisfy conditions (1) to (3) and conditions (6) to (8), respectively.

Figure 4:
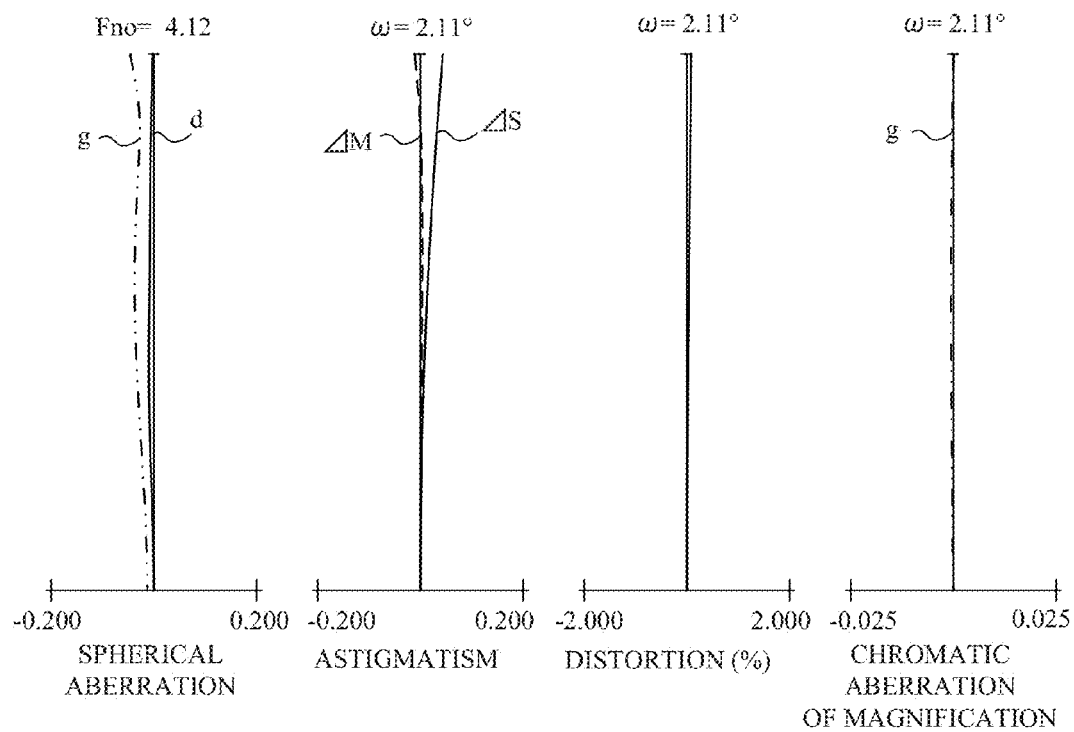
FIG. 4 is an aberration diagram of the telephoto lens of Embodiment 2 in an in-focus state on an object at infinity.

The optical system configured as described above has sufficiently corrected aberrations, especially the chromatic aberration of magnification and the field curvature (astigmatism), as illustrated in FIG. 4.

The present embodiment achieves a compact and light optical system which includes the diffractive optical element and whose chromatic aberration and other aberrations (especially, field curvature) are sufficiently corrected over the entire visible wavelength range.

Embodiment 3

Figure 5:
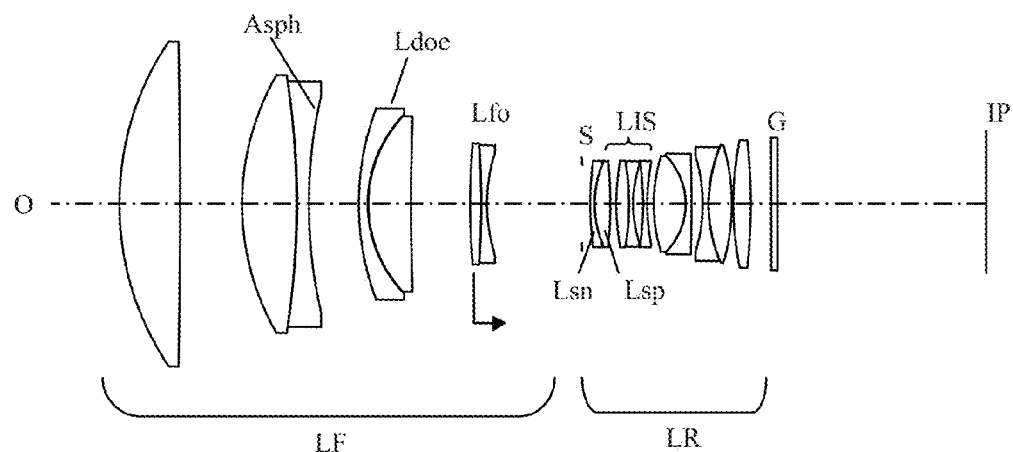
FIG. 5 is a cross-sectional view illustrating a telephoto lens of Embodiment 3 of the present invention.

An optical system of Embodiment 3 illustrated in FIG. 5 is an optical system for a super-telephoto lens having a focal length of 400 mm and an Fno of 4.0. Similarly to Embodiment 1, the front lens unit LF has a positive refractive power, and the rear lens unit LR also has a positive refractive power. The diffractive optical element Ldoe and the aspheric surface Asph are provided at the same positions as those in Embodiment 1. As well as in Embodiment 1, the diffractive surface of the diffractive optical element Ldoe has a positive refractive power.

Similarly to Embodiment 1, the rear lens unit LR is constituted by the rear stop side negative lens Lsn, the rear stop side positive lens Lsp, and other positive and negative lenses, which are disposed in order from the object side to the image side. Similarly to Embodiment 1, the rear stop side negative lens Lsn and the rear stop side positive lens Lsp constitute a cemented lens. In addition, the focus lens Lfo and the image stabilizing lens LIS are disposed at the same positions and moved in the same manners as those in Embodiment 1.

In the present embodiment, S-NBM51 is used as the optical material of the rear stop side positive lens Lsp as well as in Embodiment 1. On the other hand, S-NPH1 (trade name by OHARA INC.) is used as the optical material of the rear stop side negative lens Lsn, which is a difference from Embodiment 1. These optical materials (glass materials) satisfy conditions (1) to (3) and conditions (6) to (8), respectively.

Figure 6:
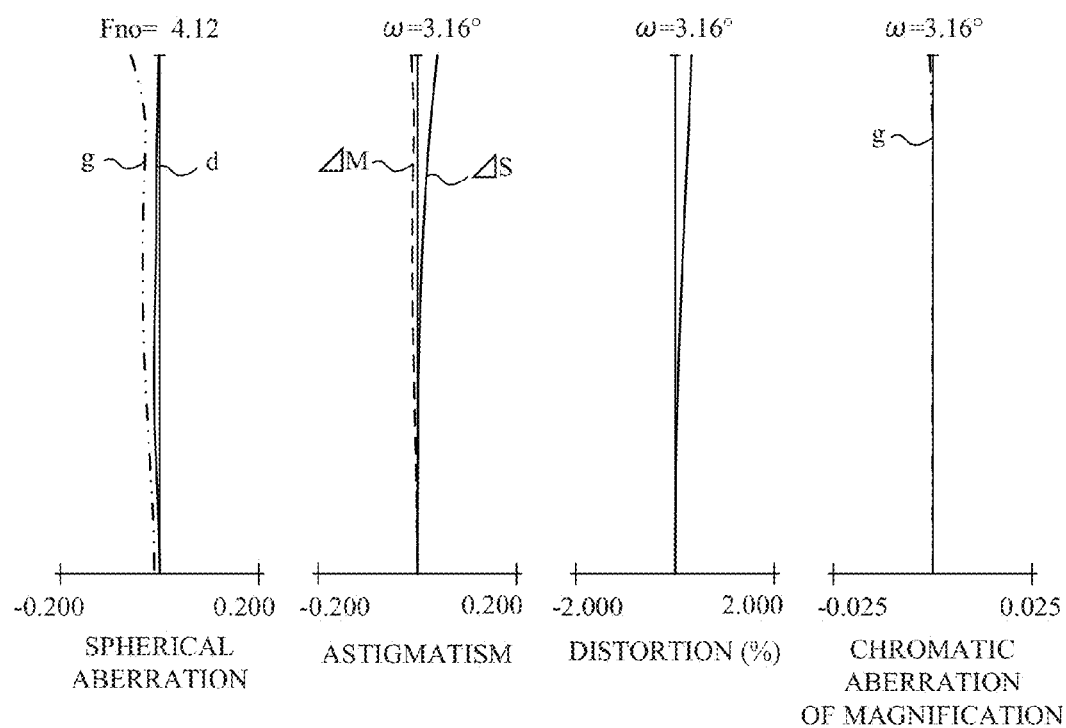
FIG. 6 is an aberration diagram of the telephoto lens of Embodiment 3 in an in-focus state on an object at infinity.

The optical system configured as described above has sufficiently corrected aberrations, especially the chromatic aberration of magnification and the field curvature (astigmatism), as illustrated in FIG. 6.

The present embodiment achieves a compact and light optical system which includes the diffractive optical element and whose chromatic aberration and other aberrations (especially, field curvature) are sufficiently corrected over the entire visible wavelength range.

Embodiment 4

Figure 7:
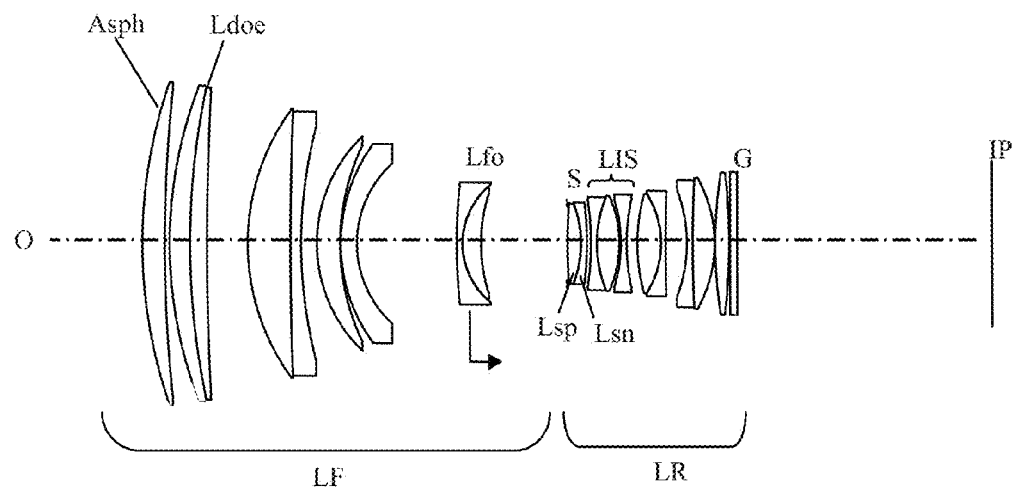
FIG. 7 is a cross-sectional view illustrating a telephoto lens of Embodiment 4 of the present invention.

An optical system of Embodiment 4 illustrated in FIG. 7 is an optical system for a super-telephoto lens having a focal length of 400 mm and an Fno of 4.0. Similarly to Embodiment 1, the front lens unit LF has a positive refractive power, and the rear lens unit LR also has a positive refractive power. The aspheric surface Asph is provided to a most object side surface in the front lens unit LF. The diffractive optical element Ldoe is provided to a cemented surface of a cemented lens constituted by a second positive lens and a third positive lens in the front lens unit LF, which are counted from the object side. As well as in Embodiment 1, the diffractive surface of the diffractive optical element Ldoe has a positive refractive power.

The rear lens unit LR includes the rear stop side positive lens Lsp, the rear stop side negative lens Lsn, and other positive and negative lenses, which are disposed in order from the object side to the image side. The rear stop side positive lens Lsp and the rear stop side negative lens Lsn constitute a cemented lens in which an image side surface of the rear stop side positive lens Lsp and an object side surface of the rear stop side negative lens Lsn are cemented to each other.

The focus lens (cemented lens) Lfo and the image stabilizing lens LIS are disposed at the same positions and moved in the same manners as those in Embodiment 1.

In the present embodiment, S-NBH5 (the same as in Embodiment 2) and S-TIH53 (trade name by OHARA INC.) are used as the optical materials (glass materials) of the rear stop side positive lens Lsp and the rear stop side negative lens Lsn, respectively. Although the glass materials and arrangement order of the rear stop side positive lens Lsp and the rear stop side negative lens Lsn are different from those in Embodiment 1, these lenses have the same basic functions in aberration correction as those in Embodiment 1.

The optical materials (glass materials) of the rear stop side positive lens Lsp and the rear stop side negative lens Lsn satisfy conditions (1) to (3) and conditions (6) to (8), respectively.

Figure 8:
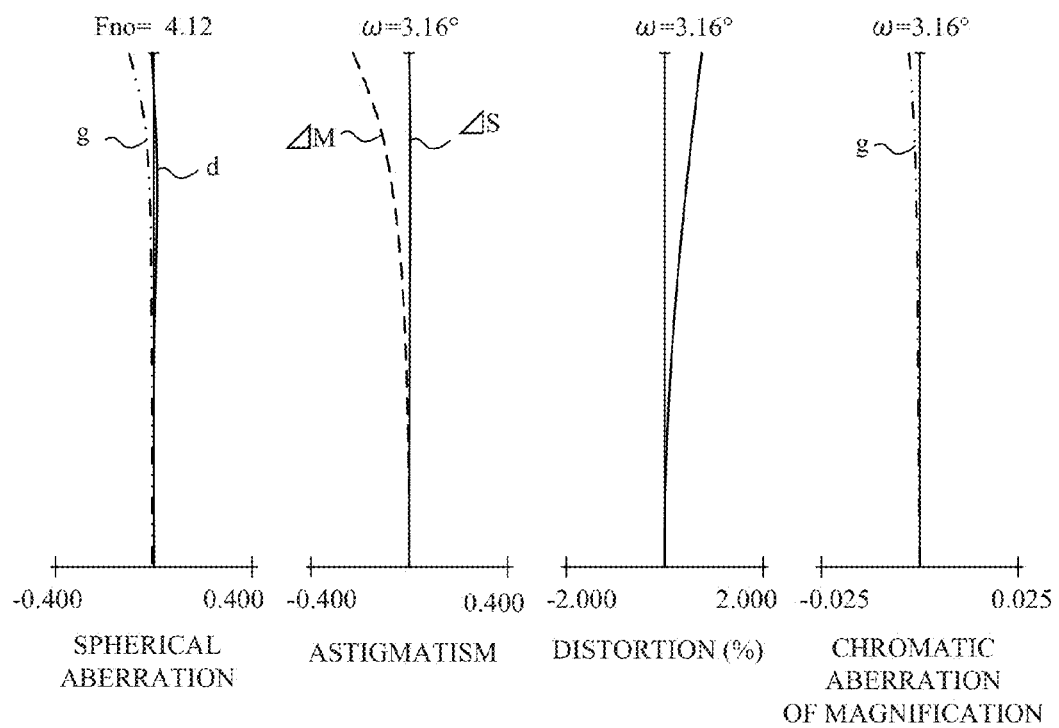
FIG. 8 is an aberration diagram of the telephoto lens of Embodiment 4 in an in-focus state on an object at infinity.

The optical system configured as described above has sufficiently corrected aberrations, especially the chromatic aberration of magnification and the field curvature (astigmatism), as illustrated in FIG. 8.

The present embodiment achieves a compact and light optical system which includes the diffractive optical element and whose chromatic aberration and other aberrations (especially, field curvature) are sufficiently corrected over the entire visible wavelength range.

Figure 10A:
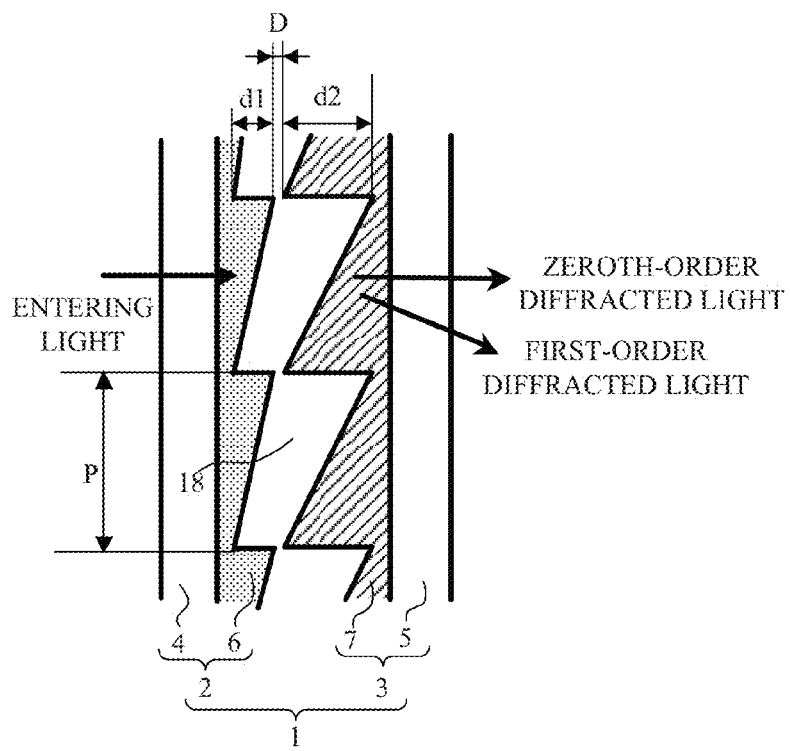
FIG. 10A is a diagram illustrating the structure of a double-layered diffractive optical element in each of the embodiments.
Figure 11A:
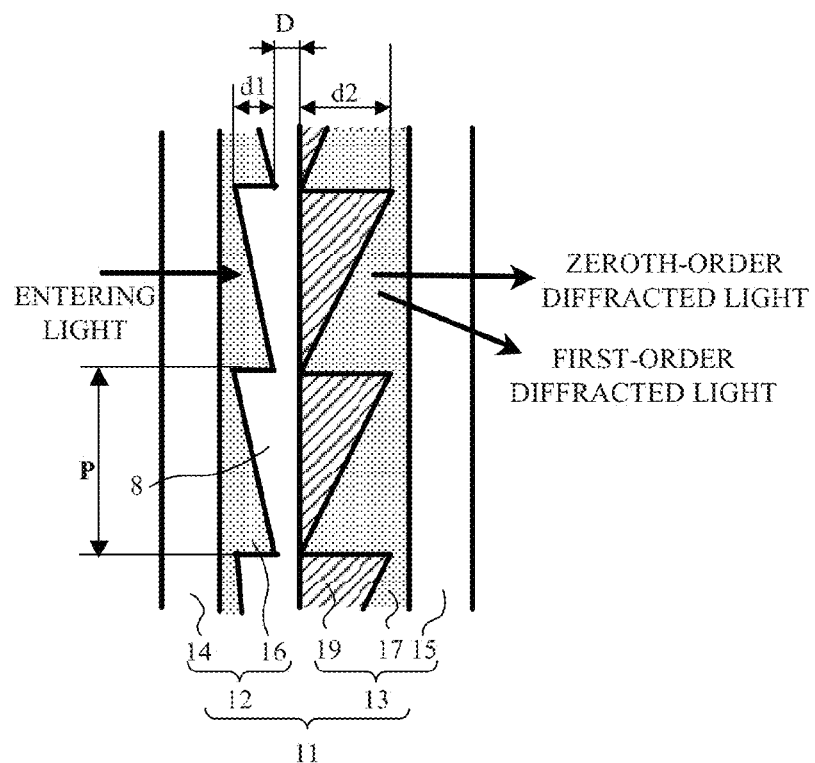
FIG. 11A is a diagram illustrating the structure of a triple-layered diffractive optical element in each of the embodiments.
Figure 12A:
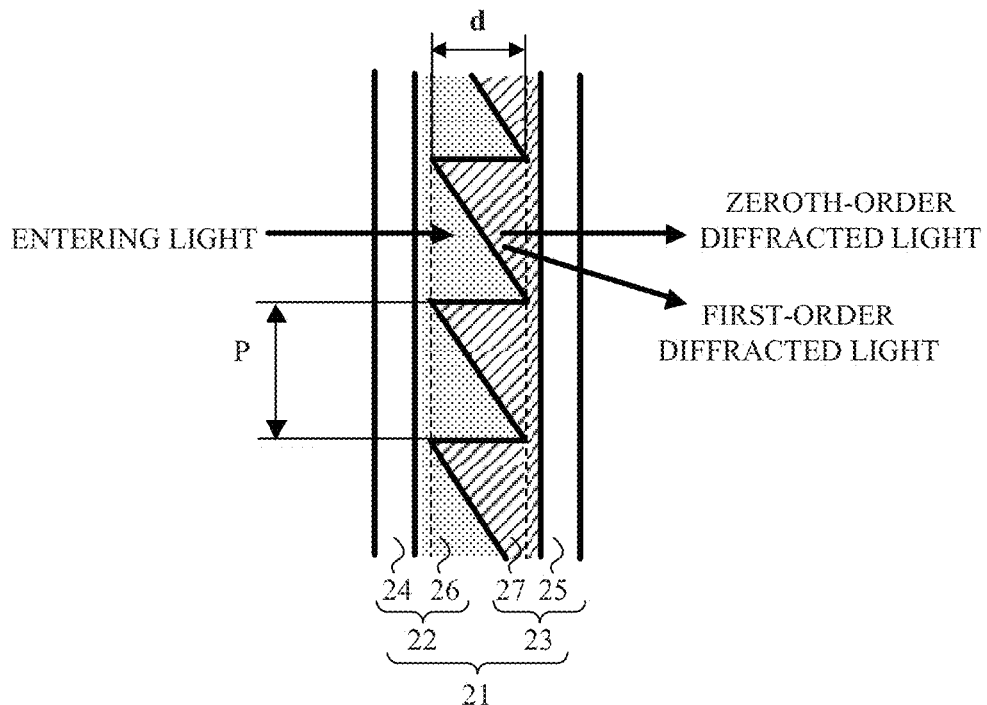
FIG. 12A is a diagram illustrating the structure of a contact double-layered diffractive optical element in each of the embodiments.

Next, description of the diffractive optical element Ldoe included in each of the embodiments will be made. The diffractive optical elements include ones having different structures such as a double-layered diffractive optical element with a space layer disposed therebetween as illustrated in FIG. 10A, and a triple-layered diffractive optical element with space layers disposed therebetween as illustrated in FIG. 11A. In addition, the diffractive optical elements include, as illustrated in FIG. 12A, a contact double-layered diffractive optical element in which two layers having a same grating thickness are contacted each other. Any of these diffractive optical elements can be used in each of the embodiments.

The double-layered diffractive optical element 1 illustrated in FIG. 10A includes a first diffraction grating 6 formed of a first ultraviolet curable resin and formed on a glass substrate 4, and a second diffraction grating 7 formed of a second ultraviolet curable resin and formed on another glass substrate 5, the second ultraviolet curable resin being different from the first ultraviolet curable resin. These first and the second diffraction gratings 6 and 7 are closely disposed with a space layer 8 disposed therebetween and having a thickness D. These two diffraction gratings 6 and 7 are combined to function as one diffractive optical element.

The first diffraction grating 6 has a maximum grating thickness d1, and the second diffraction grating 7 has a maximum grating thickness d2. In FIG. 10A, the grating thickness of the first diffraction grating 6 monotonically decreases from its top to its bottom, and the grating thickness of the second diffraction grating 7 monotonically increases from its top to its bottom. The first and second diffraction gratings 6 and 7 have a same grating pitch P.

As illustrated by arrows in FIG. 10A, when light enters the diffractive optical element 1 from the left side, that is, from a glass substrate 4 (first diffraction grating 6) side, a first-order diffracted light exits therefrom in the right-down direction and a zeroth-order diffracted light exits therefrom in the right direction (straight direction).

Figure 10B:
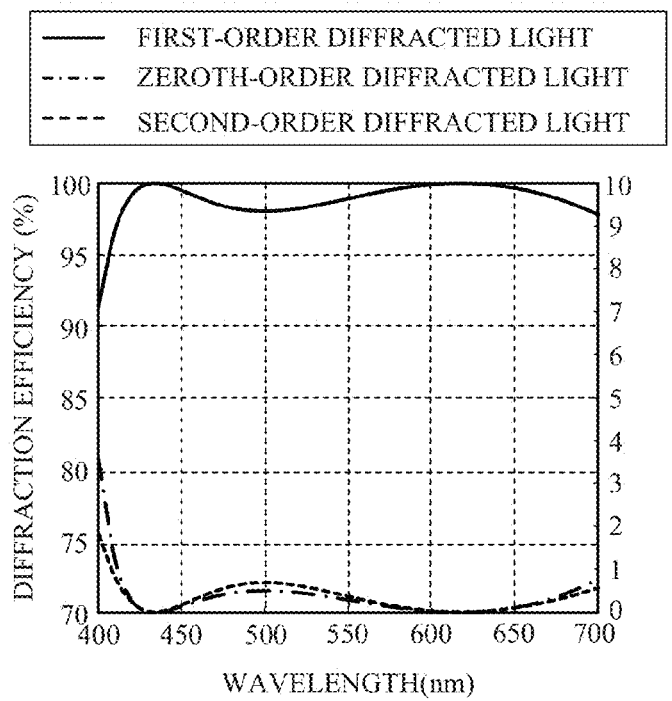
FIG. 10B is a graph for explaining a wavelength-dependent property of the diffraction efficiency of the double-layered diffractive optical element.

FIG. 10B illustrates wavelength-dependent properties of diffraction efficiencies of the first-order diffracted light, the zeroth-order diffracted light and a second-order diffracted light exiting from the double-layered diffractive optical element 1 illustrated in FIG. 10A. The first-order diffracted light is a diffracted light of a design diffracton order of the double-layered diffractive optical element 1, and the zeroth-order and second-order diffracted lights are (design diffraction order ±1)-th diffracted lights.

In the diffractive optical element 1, the material of the first diffraction grating 6 has (nd1, vd1)=(1.636, 22.8), and the grating thickness d1 thereof is 7.88 μm. The material of the second diffraction grating 7 has (nd2, vd2)=(1.524, 51.6), the grating thickness d2 thereof is 10.71 μm. The space thickness D is 1.5 μm, and the grating pitch P is 200 μm.

As understood from FIG. 10B, the diffractive optical element 1 achieves a high diffraction efficiency of substantially 90% or more for the design order diffracted light (first-order diffracted light) over an entire use wavelength range. On the other hand, the diffractive optical element 1 sufficiently suppresses the diffraction efficiencies for the zeroth-order and the second-order diffracted lights, which are unnecessary diffraction order lights, to substantially 5% or less over the entire use wavelength range.

The triple-layered diffractive optical element 11 illustrated in FIG. 11A includes a first diffraction grating 16 formed of a first ultraviolet curable resin and formed on a glass substrate 14, and a second diffraction grating 17 formed of a second ultraviolet curable resin and formed on another glass substrate 15, the second ultraviolet curable resin being different from the first ultraviolet curable resin. V-shaped concave portions of the second diffraction grating 17 are filled with a third ultraviolet curable resin 19 different from the first and second ultraviolet curable resins. The first and second diffraction gratings 16 and 17 are closely disposed with a space layer 18 disposed therebetween and having a thickness D. These two diffraction gratings 16 and 17 are combined to function as one diffractive optical element.

The first diffraction grating 16 has a maximum grating thickness d1, and the second diffraction grating 7 has a maximum grating thickness d2. In FIG. 11A, the grating thickness of each of the first and second diffraction gratings 16 and 17 monotonically increases from its top to its bottom. The first and second diffraction gratings 16 and 17 have a same grating pitch P.

As illustrated by arrows in FIG. 11A, when light enters the diffractive optical element 11 from the left side, that is, from a glass substrate 14 (first diffraction grating 16) side, a first-order diffracted light exits therefrom in the right-down direction, and a zeroth-order diffracted light exits therefrom in the right direction (straight direction).

Figure 11B:
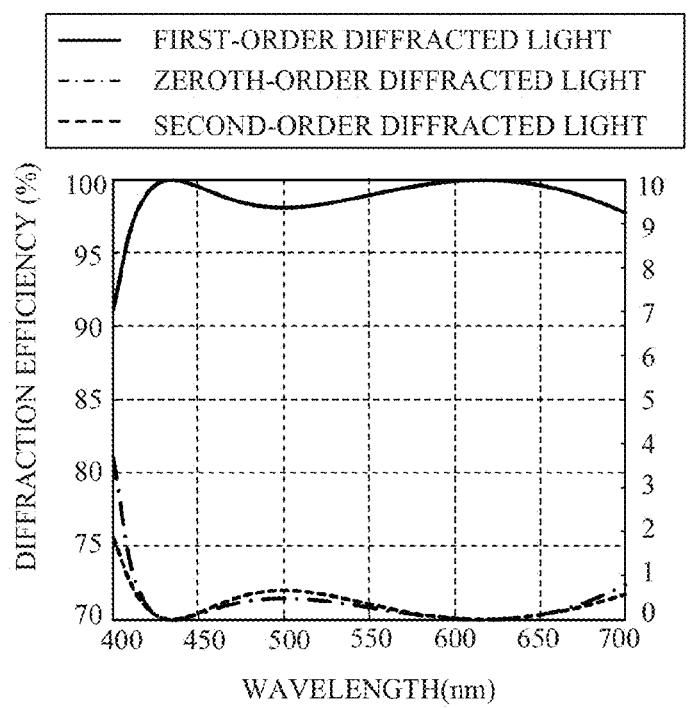
FIG. 11B is a graph for explaining a wavelength-dependent property of the diffraction efficiency of the triple-layered diffractive optical element.

FIG. 11B illustrates wavelength-dependent properties of diffraction efficiencies of the first-order diffracted light, the zeroth-order diffracted light and a second-order diffracted light exiting from the triple-layered diffractive optical element 11 illustrated in FIG. 11A. The first-order diffracted light is a diffracted light of a design diffraction order of the triple-layered diffractive optical element 11, and the zeroth-order and second-order diffracted lights are (design diffraction order ±1)-th diffracted lights.

In the diffractive optical element 11, the material of the first diffraction grating 16 has (nd1, vd1)=(1.636, 22.8), and the grating thickness d1 thereof is 2.83 μm. As the materials of the second diffraction grating 17, the second ultraviolet curable resin has (nd2-1, vd2-1)=(1.524, 51.6), and the third ultraviolet curable resin has (nd2-2, vd2-2)=(1.636, 22.8). The grating thickness d2 of the second diffraction grating 17 is 7.88 μm. The space distance D is 1.5 μm, and the grating pitch P is 200 μm.

As understood from FIG. 11B, the diffractive optical element 11 achieves a high diffraction efficiency of substantially 90% or more for the design order diffracted light (first-order diffracted light) over the entire use wavelength range. On the other hand, the diffractive optical element 11 sufficiently suppresses the diffraction efficiencies for the zeroth-order and second-order diffracted lights, which are unnecessary diffraction order lights, to substantially 5% or less over the entire use wavelength range.

The contact double-layered diffractive optical element 21 illustrated in FIG. 12A includes a first diffraction grating 26 formed of a first ultraviolet curable resin and formed on a glass substrate 24, and a second diffraction grating 27 formed of a second ultraviolet curable resin and formed on another glass substrate 25, the second ultraviolet curable resin being different from the first ultraviolet curable resin. The first and second diffraction gratings 26 and 27 have a same maximum grating thickness d and a same grating pitch P. The grating thickness of the first diffraction grating 26 monotonically increases from its top to its bottom, and the grating thickness of the second diffraction grating 27 monotonically increases from its bottom to its top. Grating surfaces of the first and second diffraction gratings 26 and 27 are contacted to each other. These two diffraction gratings 26 and 27 are combined to function as one diffractive optical element.

As illustrated by arrows in FIG. 12A, when light enters the diffractive optical element 21 from the left side, that is, from a glass substrate 24 (first diffraction grating 26) side, a first-order diffracted light exits therefrom in the right-down direction, and a zeroth-order diffracted light exits therefrom in the right direction (straight direction).

Figure 12B:
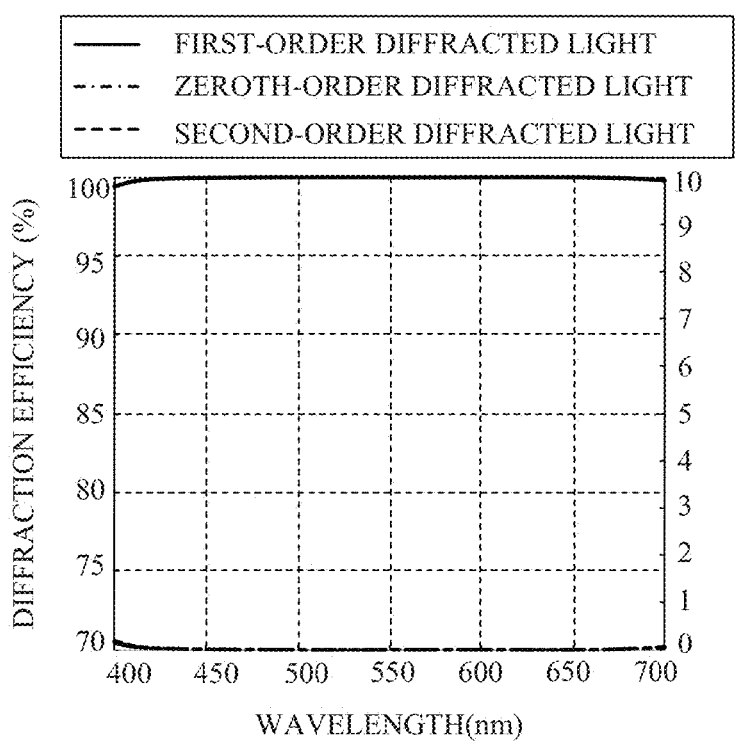
FIG. 12B is a graph for explaining a wavelength-dependent property of the diffraction efficiency of the contact double-layered diffractive optical element.

FIG. 12B illustrates wavelength-dependent properties of diffraction efficiencies of the first-order diffracted light, the zeroth-order diffracted light and a second-order diffracted light exiting from the contact double-layered diffractive optical element 21 illustrated in FIG. 12A. The first-order diffracted light is a diffracted light of a design diffraction order of the contact double-layered diffractive optical element 21, and the zeroth-order and second-order diffracted lights are (design diffraction order ±1)-th diffracted lights.

In the diffractive optical element 21, the material of the first diffraction grating 26 has (nd1, vd1)=(1.567, 46.6), and the material of the second diffraction grating 7 has (nd2, vd2)= (1.504, 16.3). The grating thickness d is 9.29 μm, and the grating pitch P is 200 μm.

As understood from FIG. 12B, the diffractive optical element 21 achieves a high diffraction efficiency of substantially 99.5% or more for the design order diffracted light (first-order diffracted light) over the entire use wavelength range. On the other hand, the diffractive optical element 21 significantly suppresses the diffraction efficiencies for the zeroth-order and second-order diffracted lights, which are unnecessary diffraction order lights, to substantially 0.05% or less over the entire use wavelength range.

The diffractive optical elements illustrated in FIG. 10A, FIG. 11A and FIG. 12A are merely examples, and the diffractive optical element may have other structures as long as it has higher basic performance such as diffraction efficiency than these examples of the diffractive optical element have.

Although the diffractive optical element is provided on an optical surface, the optical surface may be any of a spherical surface, a planar surface and an aspheric surface. Although each of the embodiments described the case where the diffractive optical element is provided to the cemented surface of the cemented lens, the diffractive optical element may be provided other surfaces than the cemented surface.

As a method of manufacturing the diffractive optical element of each of the embodiments, in addition to a method of forming binary optics geometry directly on a lens surface using a photoresist, methods of performing a replica forming and a mold forming with a mold manufactured by the above method are applicable. A sawtooth shaped kinoform leads to an improved diffraction efficiency, whereby a high diffraction efficiency close to an ideal value can be expected.

Figure 13:
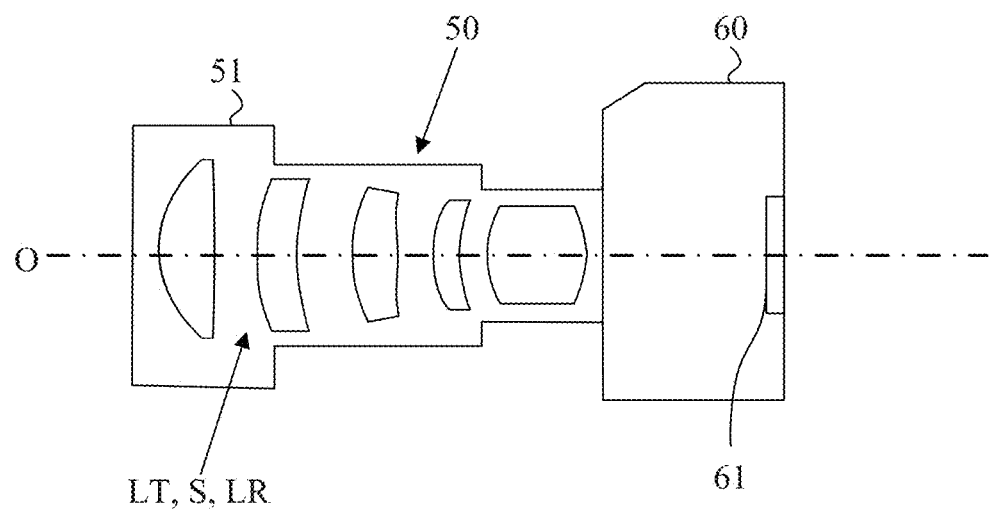
FIG. 13 is a diagram illustrating an interchangeable lens including an optical system of each of the embodiments and a digital camera to which the interchangeable lens is mounted.

FIG. 13 illustrates an interchangeable lens (optical apparatus) 50 including the optical system of each of the embodiments, and a digital camera (image pickup apparatus) 60 to which the interchangeable lens 50 is attached (mounted).

The interchangeable lens 50 includes a barrel (body) 51, and the optical system (LF, S and LR), which is described in any of Embodiments 1 to 4, housed in the barrel 51. In the digital camera 60, an image sensor 61 constituted by a CMOS sensor or a CCD sensor is disposed at a position corresponding to the image surface IP described in each of the embodiments. The image sensor 61 photoelectrically converts an object image formed by the optical system to produce image data. Although FIG. 13 illustrates the interchangeable lens as an example of the optical apparatus, other examples of the optical apparatus include a lens-integrated image pickup apparatus (including a video camera) and an observation apparatus such as a telescope.

The following describes Numerical Examples 1 to 4 respectively corresponding to Embodiments 1 to 4. In each of the numerical examples, ri represents a curvature radius of an i-th optical surface counted from the object side, di represents an i-th intersurface distance, which is counted from the object side, on the optical axis in a reference state. Moreover, ndi and vdi respectively represent a refractive index and an Abbe number for the d-line of an i-th optical material counted from the object side. Furthermore, "(diffraction)" represents the diffractive optical element (diffractive surface), and "(stop)" represents the aperture stop.

A phase shape ψ of the diffractive surface is expressed by the following expression:

$$\psi(h,m) = (2\pi/m\lambda_0) \times (C_1 \cdot r^2 + C_2 \cdot r^4 + C_3 \cdot r^6 + \ldots)$$

where m represents a diffraction order of a diffracted light, λ0 represents a design wavelength, r represents a height in a direction orthogonal to the optical axis, Ci(i=1, 2, 3, ...) represents phase coefficients.

An aspheric shape of the aspheric surface is expressed in the following expression:

$$X(h) = \frac{(1/R)r^2}{1+\sqrt{1-(1+k)(r/R)^2}} + Br^4 + Cr^6 + Dr^8 + Er^{10} + \ldots$$

where X represents a displacement amount from a surface apex in the optical axis direction, r represents the height from the optical axis in the direction orthogonal to the optical axis, R represents a paraxial curvature radius, k represents a conic constant, and B, C, D, E, ... represent aspheric coefficients. In addition, e±M means×$10^{\pm M}$.

Table 1 lists the values of conditions (1) to

(12) in each of the numerical examples (each of the embodiments).

Numerical Example 1

Unit mm

Surface data

| Surface Number | r | d | nd | vd | Effective diameter |
|---|---|---|---|---|---|
| 1 | 93.582 | 18.52 | 1.48749 | 70.2 | 95.19 |
| 2 | −2351.918 | 19.72 | | | 93.31 |
| 3 | 77.629 | 16.68 | 1.49700 | 81.5 | 75.60 |
| 4 | −289.462 | 0.14 | | | 72.12 |
| 5 | −273.942 | 3.62 | 1.77250 | 49.6 | 72.11 |
| 6* | 181.044 | 14.60 | | | 66.88 |
| 7 | 85.547 | 2.76 | 1.78590 | 44.2 | 55.68 |
| 8 | 38.602 | 0.04 | 1.61972 | 43.0 | 50.62 |
| 9(diffraction) | 38.602 | 0.01 | 1.56691 | 19.4 | 50.60 |
| 10 | 38.602 | 13.11 | 1.48749 | 70.2 | 50.60 |
| 11 | 401.325 | (variable) | | | 48.44 |
| 12 | 231.237 | 3.29 | 1.80809 | 22.8 | 34.56 |
| 13 | −301.776 | 1.80 | 1.88300 | 40.8 | 33.54 |
| 14 | 53.775 | 0.00 | | | 31.50 |
| 15 | ∞ | (variable) | | | 32.19 |
| 16(stop) | ∞ | 2.50 | | | 23.63 |
| 17 | 83.447 | 1.30 | 1.84666 | 23.9 | 24.00 |
| 18 | 30.211 | 4.86 | 1.61340 | 44.3 | 23.86 |
| 19 | −142.911 | 1.80 | | | 23.98 |
| 20 | 68.323 | 3.91 | 1.84666 | 23.9 | 24.34 |
| 21 | −97.194 | 1.30 | 1.81600 | 46.6 | 23.94 |
| 22 | 35.418 | 3.20 | | | 23.19 |
| 23 | −80.818 | 1.30 | 1.88300 | 40.8 | 23.28 |
| 24 | 76.754 | 1.89 | | | 24.23 |
| 25 | ∞ | 0.00 | | | 24.90 |
| 26 | 52.056 | 9.70 | 1.62588 | 35.7 | 26.29 |
| 27 | −21.000 | 1.80 | 1.59522 | 67.7 | 27.14 |
| 28 | −599.046 | 3.44 | | | 28.81 |
| 29 | −53.080 | 1.80 | 1.80809 | 22.8 | 29.39 |
| 30 | 45.739 | 7.08 | 1.67300 | 38.1 | 32.60 |
| 31 | −64.197 | 0.50 | | | 33.67 |
| 32 | 96.396 | 5.36 | 1.84666 | 23.9 | 36.41 |
| 33 | −210.983 | 0.00 | | | 36.79 |
| 34 | ∞ | 0.00 | | | 36.87 |
| 35 | ∞ | 6.20 | | | 36.87 |
| 36 | ∞ | 2.00 | 1.51633 | 64.1 | 37.89 |
| 37 | ∞ | 8.00 | | | 38.17 |
| 38 | ∞ | 16.00 | | | 39.85 |
| 39 | ∞ | 34.96 | | | 43.20 |
| 40 | ∞ | (variable) | | | 50.73 |
| IP | ∞ | | | | |

Aspheric data

Sixth surface

K = 2.91996e+000  A4 = 2.19192e−008  A6 = −7.23770e−012
A8 = −1.72937e−015  A10 = −1.72503e−019

Ninth surface (diffraction surface)

C1 = −6.49988e−005  C2 = −1.33932e−008  C3 = −8.84305e−012
C4 = 2.14168e−015  C5 = −5.80465e−019

Various data

| | |
|---|---|
| Zoom ratio | 1.00 |
| Focal length | 392.20 |
| F-NUMBER | 4.12 |
| Angle of view | 3.16 |
| Image height | 21.64 |
| Lens length | 261.65 |
| BF | 1.37 |
| d11 | 18.11 |
| d15 | 29.00 |
| d40 | 1.37 |
| Entrance pupil position | 613.65 |
| Exit pupil position | −120.53 |
| Front principal point position | −256.03 |
| Rear principal point position | −390.83 |

Lens unit data

| Unit | Starting surface | Focal length | Length | Front principal point | Rear principal point |
|---|---|---|---|---|---|
| 1 | 1 | 133.85 | 89.18 | −2.00 | −67.63 |
| 2 | 12 | −76.82 | 5.09 | 3.54 | 0.73 |
| 3 | 16 | 2899.57 | 118.89 | 620.35 | 668.68 |

Single lens data

| Lens | Starting surface | Focal length |
|---|---|---|
| 1 | 1 | 185.08 |
| 2 | 3 | 125.05 |
| 3 | 5 | −140.62 |
| 4 | 7 | −91.88 |
| 5 | 8 | 7336.63 |
| 6 | 9 | 7631.83 |
| 7 | 10 | 86.59 |
| 8 | 12 | 162.46 |
| 9 | 13 | −51.57 |
| 10 | 17 | −56.57 |
| 11 | 18 | 41.10 |
| 12 | 20 | 47.91 |
| 13 | 21 | −31.67 |
| 14 | 23 | −44.41 |
| 15 | 26 | 25.20 |
| 16 | 27 | −36.61 |
| 17 | 29 | −30.16 |
| 18 | 30 | 40.74 |
| 19 | 32 | 78.78 |
| 20 | 36 | 0.00 |

Numerical Example 2

Unit mm

Surface data

| Surface Number | r | d | nd | vd | Effective diameter |
|---|---|---|---|---|---|
| 1 | 137.558 | 28.00 | 1.48749 | 70.2 | 142.79 |
| 2 | −3171.802 | 27.20 | | | 140.01 |
| 3 | 127.321 | 25.89 | 1.49700 | 81.5 | 114.70 |
| 4 | −396.795 | 0.20 | | | 108.42 |
| 5 | −377.047 | 5.43 | 1.77250 | 49.6 | 108.41 |
| 6* | 227.854 | 27.82 | | | 100.13 |
| 7 | 115.567 | 4.50 | 1.83481 | 42.7 | 82.57 |
| 8 | 61.217 | 0.06 | 1.61972 | 43.0 | 76.03 |
| 9(diffraction) | 61.217 | 0.01 | 1.56691 | 19.4 | 76.00 |
| 10 | 61.217 | 19.50 | 1.48749 | 70.2 | 76.00 |
| 11 | 1065.089 | (variable) | | | 72.81 |
| 12 | 313.980 | 4.94 | 1.80809 | 22.8 | 52.00 |
| 13 | −574.653 | 2.70 | 1.88300 | 40.8 | 50.46 |
| 14 | 79.551 | 0.00 | | | 47.43 |
| 15 | ∞ | (variable) | | | 48.46 |
| 16(stop) | ∞ | 3.75 | | | 36.07 |
| 17 | 133.792 | 1.95 | 1.84666 | 23.9 | 36.11 |
| 18 | 43.330 | 7.50 | 1.65412 | 39.7 | 35.56 |
| 19 | −260.532 | 3.79 | | | 35.46 |
| 20 | 85.390 | 6.19 | 1.84666 | 23.9 | 34.61 |
| 21 | −147.138 | 1.95 | 1.81600 | 46.6 | 33.67 |
| 22 | 47.611 | 4.42 | | | 32.12 |
| 23 | −117.432 | 1.95 | 1.88300 | 40.8 | 32.16 |
| 24 | 116.747 | 2.82 | | | 32.89 |
| 25 | ∞ | 0.00 | | | 33.99 |
| 26 | 76.851 | 14.55 | 1.62004 | 36.3 | 35.12 |
| 27 | −32.293 | 2.70 | 1.59522 | 67.7 | 36.30 |
| 28 | −11262.236 | 4.94 | | | 37.55 |
| 29 | −97.122 | 2.70 | 1.80809 | 22.8 | 38.29 |
| 30 | 65.201 | 10.65 | 1.72047 | 34.7 | 40.76 |
| 31 | −105.368 | 0.52 | | | 42.67 |
| 32 | 122.014 | 7.80 | 1.80000 | 29.8 | 44.25 |
| 33 | −896.880 | 0.00 | | | 44.34 |
| 34 | ∞ | 0.00 | | | 44.33 |
| 35 | ∞ | 9.30 | | | 44.33 |

-continued

Unit mm

| | | | | | |
|---|---|---|---|---|---|
| 36 | ∞ | 3.00 | 1.51633 | 64.1 | 44.24 |
| 37 | ∞ | 12.00 | | | 44.22 |
| 38 | ∞ | 24.00 | | | 45.17 |
| 39 | ∞ | 52.40 | | | 47.86 |
| 40 | ∞ | (variable) | | | 53.90 |
| IP | ∞ | | | | |

Aspheric data

Sixth surface

K = 2.60049e+000    A4 = 9.70179e−010    A6 = −9.01108e−013
A8 = 4.36165e−017   A10 = −3.70100e−020

Ninth surface (diffraction surface)

C1 = −4.27780e−005   C2 = −2.97904e−009   C3 = 1.88511e−013
C4 = −1.00396e−015   C5 = 3.54526e−019

Various data

| | |
|---|---|
| Zoom ratio | 1.00 |
| Focal length | 588.30 |
| F-NUMBER | 4.12 |
| Angle of view | 2.11 |
| Image height | 21.64 |
| Lens length | 397.80 |
| BF | 2.02 |
| d11 | 27.16 |
| d15 | 43.50 |
| d40 | 2.02 |
| Entrance pupil position | 922.47 |
| Exit pupil position | −177.82 |
| Front principal point position | −413.78 |
| Rear principal point position | −586.29 |

Lens unit data

| Unit | Starting surface | Focal length | Unit Length | Front principal point | Rear principal point |
|---|---|---|---|---|---|
| 1 | 1 | 205.56 | 138.62 | 3.82 | −104.30 |
| 2 | 12 | −117.12 | 7.64 | 5.46 | 1.23 |
| 3 | 16 | 4095.96 | 178.87 | 761.77 | 757.99 |

Single lens data

| Lens | Starting surface | Focal length |
|---|---|---|
| 1 | 1 | 271.20 |
| 2 | 3 | 197.18 |
| 3 | 5 | −183.14 |
| 4 | 7 | −162.03 |
| 5 | 8 | 11196.40 |
| 6 | 9 | 11604.75 |
| 7 | 10 | 132.39 |
| 8 | 12 | 251.89 |
| 9 | 13 | −78.98 |
| 10 | 17 | −76.45 |
| 11 | 18 | 57.36 |
| 12 | 20 | 64.61 |
| 13 | 21 | −43.88 |
| 14 | 23 | −66.04 |
| 15 | 26 | 38.64 |
| 16 | 27 | −54.41 |
| 17 | 29 | −47.92 |
| 18 | 30 | 57.41 |
| 19 | 32 | 134.71 |
| 20 | 36 | 0.00 |

Numerical Example 3

Unit mm

Surface data

| Surface Number | r | d | nd | vd | Effective diameter |
|---|---|---|---|---|---|
| 1 | 89.153 | 18.63 | 1.48749 | 70.2 | 95.19 |
| 2 | −2256.993 | 19.00 | | | 93.45 |
| 3 | 79.631 | 16.65 | 1.49700 | 81.5 | 75.24 |
| 4 | −253.634 | 0.14 | | | 71.65 |
| 5 | −241.534 | 3.62 | 1.77250 | 49.6 | 71.64 |
| 6* | 156.940 | 15.23 | | | 65.96 |
| 7 | 83.740 | 2.77 | 1.78590 | 44.2 | 55.38 |
| 8 | 39.202 | 0.04 | 1.61972 | 43.0 | 50.62 |
| 9(diffraction) | 39.202 | 0.01 | 1.56691 | 19.4 | 50.60 |
| 10 | 39.202 | 13.15 | 1.48749 | 70.2 | 50.60 |
| 11 | 610.925 | (variable) | | | 48.52 |
| 12 | 222.044 | 3.38 | 1.80809 | 22.8 | 34.45 |
| 13 | −266.018 | 1.80 | 1.88300 | 40.8 | 33.43 |
| 14 | 52.149 | 0.00 | | | 31.33 |
| 15 | ∞ | (variable) | | | 32.01 |
| 16(stop) | ∞ | 2.50 | | | 23.84 |
| 17 | 86.436 | 1.30 | 1.80809 | 22.8 | 24.29 |
| 18 | 31.625 | 4.86 | 1.61340 | 44.3 | 24.18 |
| 19 | −134.664 | 1.80 | | | 24.30 |
| 20 | 74.053 | 3.94 | 1.84666 | 23.9 | 24.56 |
| 21 | −78.545 | 1.30 | 1.81600 | 46.6 | 24.17 |
| 22 | 38.700 | 2.97 | | | 23.41 |
| 23 | −93.435 | 1.30 | 1.88300 | 40.8 | 23.48 |
| 24 | 64.844 | 2.04 | | | 24.30 |
| 25 | ∞ | 0.00 | | | 24.96 |
| 26 | 51.301 | 9.70 | 1.62588 | 35.7 | 26.31 |
| 27 | −21.030 | 1.80 | 1.59522 | 67.7 | 27.10 |
| 28 | −517.286 | 3.44 | | | 28.63 |
| 29 | −49.545 | 1.80 | 1.80809 | 22.8 | 29.13 |
| 30 | 45.675 | 7.00 | 1.67300 | 38.1 | 32.35 |
| 31 | −66.028 | 0.50 | | | 33.45 |
| 32 | 99.747 | 5.36 | 1.84666 | 23.9 | 36.11 |
| 33 | −186.581 | 0.00 | | | 36.52 |
| 34 | ∞ | 0.00 | | | 36.61 |
| 35 | ∞ | 6.20 | | | 36.61 |
| 36 | ∞ | 2.00 | 1.51633 | 64.1 | 37.63 |
| 37 | ∞ | 8.00 | | | 37.91 |
| 38 | ∞ | 16.00 | | | 39.62 |
| 39 | ∞ | 34.96 | | | 43.03 |
| 40 | ∞ | (variable) | | | 50.71 |
| IP | ∞ | | | | |

Aspheric data

Sixth surface

K = 2.79444e+000    A4 = 1.79417e−008    A6 = −8.41008e−012
A8 = 2.37129e−015   A10 = −2.36908e−018

Ninth surface (diffraction surface)

C1 = −6.60103e−005   C2 = −1.44967e−008   C3 = 5.49445e−012
C4 = −3.29628e−014   C5 = 2.38805e−017

Various data

| | |
|---|---|
| Zoom ratio | 1.00 |
| Focal length | 392.20 |
| F-NUMBER | 4.12 |
| Angle of view | 3.16 |
| Image height | 21.64 |
| Lens length | 261.65 |
| BF | 1.38 |
| d11 | 18.10 |
| d15 | 29.00 |
| d40 | 1.38 |
| Entrance pupil position | 615.70 |
| Exit pupil position | −119.17 |
| Front principal point position | −268.11 |
| Rear principal point position | −390.82 |

Lens unit data

-continued

Unit mm

| Unit | Starting surface | Focal length | Unit Length | principal point | principal point |
|---|---|---|---|---|---|
| 1 | 1 | 134.34 | 89.24 | −1.05 | −68.11 |
| 2 | 12 | −74.61 | 5.18 | 3.61 | 0.75 |
| 3 | 16 | 1745.24 | 118.77 | 345.08 | 310.96 |

Single lens data

| Lens | Starting surface | Focal length |
|---|---|---|
| 1 | 1 | 176.39 |
| 2 | 3 | 124.00 |
| 3 | 5 | −122.66 |
| 4 | 7 | −96.43 |
| 5 | 8 | 7239.47 |
| 6 | 9 | 7517.57 |
| 7 | 10 | 85.29 |
| 8 | 12 | 150.23 |
| 9 | 13 | −49.25 |
| 10 | 17 | −62.38 |
| 11 | 18 | 42.22 |
| 12 | 20 | 45.56 |
| 13 | 21 | −31.61 |
| 14 | 23 | −43.18 |
| 15 | 26 | 25.13 |
| 16 | 27 | −36.88 |
| 17 | 29 | −29.16 |
| 18 | 30 | 41.15 |
| 19 | 32 | 77.44 |
| 20 | 36 | 0.00 |

Numerical Example 4

Unit mm

Surface data

| Surface Number | r | d | nd | vd | Effective diameter |
|---|---|---|---|---|---|
| 1* | 152.128 | 6.88 | 1.48749 | 70.2 | 95.57 |
| 2 | 434.693 | 1.50 | | | 95.05 |
| 3 | 134.686 | 6.34 | 1.48749 | 70.2 | 93.34 |
| 4(diffraction) | 233.715 | 5.30 | 1.48749 | 70.2 | 92.35 |
| 5 | 946.358 | 0.00 | | | 91.67 |
| 6 | ∞ | 0.00 | | | 92.25 |
| 7 | ∞ | 12.50 | | | 92.25 |
| 8 | 70.518 | 13.19 | 1.48749 | 70.2 | 79.23 |
| 9 | 956.876 | 3.28 | 1.65412 | 39.7 | 77.83 |
| 10 | 141.426 | 4.96 | | | 72.75 |
| 11 | ∞ | 0.00 | | | 72.59 |
| 12 | ∞ | 0.00 | | | 72.59 |
| 13 | 46.401 | 7.10 | 1.43387 | 95.1 | 62.66 |
| 14 | 70.466 | 0.15 | | | 60.71 |
| 15 | 52.490 | 5.05 | 1.74950 | 35.3 | 58.29 |
| 16 | 33.913 | 0.00 | | | 49.72 |
| 17 | ∞ | 0.20 | | | 57.15 |
| 18 | ∞ | (variable) | | | 57.02 |
| 19 | 166.207 | 1.80 | 1.80000 | 29.8 | 35.26 |
| 20 | 23.232 | 5.67 | 1.80809 | 22.8 | 31.87 |
| 21 | 50.105 | (variable) | | | 31.01 |
| 22(stop) | ∞ | 0.15 | | | 22.74 |
| 23 | 156.773 | 4.21 | 1.65412 | 39.7 | 22.86 |
| 24 | −33.891 | 1.80 | 1.84666 | 23.8 | 22.90 |
| 25 | −96.048 | 1.22 | | | 23.18 |
| 26 | −97.013 | 1.80 | 1.88300 | 40.8 | 26.08 |
| 27 | 38.750 | 6.93 | 1.69895 | 30.1 | 26.64 |
| 28 | −37.343 | 0.50 | | | 27.06 |
| 29 | −44.881 | 1.80 | 1.88300 | 40.8 | 26.87 |
| 30 | 65.670 | 3.32 | | | 27.89 |
| 31 | ∞ | 0.00 | | | 26.42 |
| 32 | 57.048 | 7.25 | 1.60342 | 38.0 | 27.87 |
| 33 | −28.910 | 1.40 | 1.80809 | 22.8 | 28.36 |
| 34 | 555.376 | 6.54 | | | 30.31 |

-continued

Unit mm

| | | | | | |
|---|---|---|---|---|---|
| 35 | −47.451 | 1.80 | 1.59282 | 68.6 | 32.84 |
| 36 | 377.832 | 6.81 | 1.69895 | 30.1 | 36.68 |
| 37 | −41.676 | 0.15 | | | 37.91 |
| 38 | 138.594 | 4.33 | 1.64769 | 33.8 | 40.78 |
| 39 | −207.363 | 0.26 | | | 41.05 |
| 40 | ∞ | 2.20 | 1.51633 | 64.1 | 41.21 |
| 41 | ∞ | (variable) | | | 41.38 |
| IP | ∞ | | | | |

Aspheric data

First surface

K = 1.65297e−002   A4 = −3.37849e−009   A6 = 5.31483e−013
A8 = −2.29213e−016   A10 = 5.01851e−020

Fourth surface (diffraction surface)

C1 = −3.11531e−005   C2 = −5.43723e−010   C3 = 3.47005e−013
C4 = −1.98795e−016   C5 = 4.26787e−020

Various data

| | |
|---|---|
| Zoom ratio | 1.00 |
| Focal length | 392.17 |
| F-NUMBER | 4.12 |
| Angle of view | 3.16 |
| Image height | 21.64 |
| Lens length | 262.16 |
| BF | 78.61 |
| d18 | 30.60 |
| d21 | 26.59 |
| d41 | 78.61 |
| Entrance pupil position | 592.07 |
| Exit pupil position | −61.93 |
| Front principal point position | −110.09 |
| Rear principal point position | −313.56 |

Lens unit data

| Unit | Starting surface | Focal length | Unit Length | Front principal point | Rear principal point |
|---|---|---|---|---|---|
| 1 | 1 | 144.55 | 66.44 | −29.74 | −60.94 |
| 2 | 19 | −94.08 | 7.47 | 6.24 | 1.97 |
| 3 | 22 | 991.13 | 52.46 | 332.98 | 439.52 |

Single lens data

| Lens | Starting surface | Focal length |
|---|---|---|
| 1 | 1 | 476.27 |
| 2 | 3 | 614.58 |
| 3 | 4 | 610.89 |
| 4 | 8 | 155.41 |
| 5 | 9 | −254.11 |
| 6 | 13 | 287.49 |
| 7 | 15 | −144.69 |
| 8 | 19 | −33.95 |
| 9 | 20 | 48.98 |
| 10 | 23 | 42.98 |
| 11 | 24 | −62.69 |
| 12 | 26 | −31.17 |
| 13 | 27 | 28.27 |
| 14 | 29 | −29.96 |
| 15 | 32 | 32.84 |
| 16 | 33 | −33.97 |
| 17 | 35 | −71.00 |
| 18 | 36 | 54.06 |
| 19 | 38 | 128.89 |
| 20 | 40 | 0.00 |

TABLE 1

| Condition No. | Condition | Lower Limit | Upper Limit | Numerical Example 1 (Embodiment 1) | Numerical Example 2 (Embodiment 2) | Numerical Example 3 (Embodiment 3) | Numerical Example 4 (Embodiment 4) |
|---|---|---|---|---|---|---|---|
| (1) | Ndsp | 1.55 | 1.700 | 1.613 | 1.654 | 1.613 | 1.654 |
| (2) | ν dsp | 30.0 | 50.0 | 44.3 | 39.7 | 44.3 | 39.7 |
| (3) | ΔθdC | 5.00000E−04 | 5.00000E−03 | 1.20420E−03 | 7.53611E−04 | 1.20420E−03 | 7.53611E−04 |
| (4) | (fsp/Lsp − img)/(Ltot/f) | 0.100 | 1.000 | 0.525 | 0.481 | 0.540 | 0.491 |
| (5) | |hsp/hbsp| | 10.000 | 15.000 | 0.815 | 0.815 | 0.815 | 0.815 |
| (6) | Ndsn | 1.750 | 1.950 | 1.847 | 1.847 | 1.808 | 1.847 |
| (7) | ν dsn | 15.0 | 30.0 | 23.9 | 23.9 | 22.8 | 23.9 |
| (8) | ΔθdC | −1.00000E−03 | −1.00000E−06 | −2.75158E−04 | −2.75158E−04 | −2.89400E−06 | −5.32789E−04 |
| (9) | |(fsn/Lsn − img)/(Ltot/f)| | 0.100 | 1.000 | 0.715 | 0.634 | 0.790 | 0.740 |
| (10) | |(Ndsn × fsn)/(Ndsp × fsp)| | 1.000 | 2.000 | 1.575 | 1.488 | 1.656 | 1.628 |
| (11) | f/fdoe | 0.010 | 0.100 | 0.051 | 0.050 | 0.052 | 0.024 |
| (12) | |hdoe/hbdoe| | 0.100 | 1.500 | 0.893 | 0.893 | 0.893 | 0.823 |

In each of the embodiments described above, the diffractive optical element and the stop side positive lens formed of an optical material having an anomalous partial dispersion property are disposed at appropriate positions, and an appropriate refractive power is provided to the stop side positive lens. This configuration enables achieving a compact and light optical system whose chromatic aberration and other aberrations (especially, field curvature) are sufficiently corrected over the entire visible wavelength range.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-136307, filed Jun. 28, 2013, which is hereby incorporated by reference herein in their entirety.

What is claimed is:

1. An optical system comprising, in order from an object side to an image side:
   a front lens unit;
   an aperture stop; and
   a rear lens unit,
   wherein the front lens unit includes a diffractive optical element,
   wherein the rear lens unit includes at least one positive lens,
   wherein among the at least one positive lens, a stop side positive lens disposed closest to the aperture stop is formed of an optical material satisfying the following conditions:

$1.55 \leq Nd_{sp} \leq 1.70$;

$30.0 \leq vd_{sp} \leq 50.0$; and $5.0 \times 10^{-4} \leq \Delta\theta dC_{sp} \leq 5.0 \times 10^{-3}$, where $Nd_{sp}$ and $vd_{sp}$ respectively represent a refractive index and an Abbe number of the optical material of the stop side positive lens for a d-line, and $\Delta\theta dC_{sp}$ represents a value defined by:

$\Delta\theta dC_{sp} = \theta dC_{sp} - (-0.17041 \times \theta gd_{sp} + 0.513577)$, where $Ng_{sp}$, $NC_{sp}$ and $NF_{sp}$ respectively represent refractive indices of the optical material of the stop side positive lens for a g-line, a C-line and an F-line, and $\theta dC_{sp}$ and $\theta gd_{sp}$ are respectively defined by:

$\theta dC_{sp} = (Nd_{sp} - NC_{sp})/(NF_{sp} - NC_{sp})$; and $\theta gd_{sp} = (Ng_{sp} - Nd_{sp})/(NF_{sp} - NC_{sp})$, and wherein the stop side positive lens is disposed at a position satisfying the following condition:

$10.0 \leq |h_{sp}/hb_{sp}| \leq 15.0$, where $h_{sp}$ represents a height of an axial paraxial ray entering the stop side positive lens, which is measured at an entrance surface of the stop side positive lens from an optical axis of the optical system, and $hb_{sp}$ represents a height of a paraxial chief ray entering the stop side positive lens, which is measured at the entrance surface of the stop side positive lens from the optical axis.

2. An optical system according to claim 1, wherein the stop side positive lens satisfies the following condition:

$0.10 \leq (f_{sp}/L_{sp-img})/(L_{tot}/f) \leq 1.00$, where f represents a focal length of the whole optical system in an in-focus state on an object at infinity, $f_{sp}$ represents a focal length of the stop side positive lens in air, $L_{tot}$ represents a total optical length of the whole optical system in the in-focus state on the object at infinity, and $L_{sp-img}$ represents a distance on an optical axis of the optical system from an object-side lens surface of the stop side positive lens to an image surface of the optical system.

3. An optical system according to claim 1, wherein:
   the rear lens unit includes at least one negative lens, and
   among the at least one negative lens, a stop side negative lens disposed closest to the aperture stop is formed of an optical material satisfying the following conditions:

$1.75 \leq Nd_{sn} \leq 1.95$;

$15.0 \leq vd_{sn} \leq 30.0$; and $-1.00 \times 10^{-3} \leq \Delta\theta dC_{sn} \leq -1.00 \times 10^{-6}$, where $Nd_{sn}$ and $vd_{sn}$ respectively represent a refractive index and an Abbe number of the optical material of the stop side negative lens for the d-line, and $\Delta\theta dC_{sn}$ represents a value defined by:

$\Delta\theta dC_{sn} = \theta dC_{sn} - (-0.17041 \times \theta gd_{sn} + 0.513577)$, where $Ng_{sn}$, $NC_{sn}$ and $NF_{sn}$ respectively represent refractive indices of the optical material of the stop side negative lens for the g-line, the C-line and the F-line, and $\theta dC_{sn}$ and $\theta gd_{sn}$ are respectively defined by:

$\theta dC_{sn} = (Nd_{sn} - NC_{sn})/(NF_{sn} - NC_{sn})$; and $\theta gd_{sn} = (Ng_{sn} - Nd_{sn})/(NF_{sn} - NC_{sn})$.

4. An optical system according to claim 3, wherein the stop side negative lens satisfies the following condition:

$$0.10 \leq |(f_{sn}/L_{sn\text{-}img})/(L_{tot}/f)| \leq 1.00,$$

where f represents a focal length of the whole optical system in an in-focus state on an object at infinity, $f_{sn}$ represents a focal length of the stop side negative lens in air, $L_{tot}$ represents a total optical length of the whole optical system in the in-focus state on the object at infinity, $L_{sn\text{-}img}$ represents a distance on an optical axis of the optical system from an object-side lens surface of the stop side negative lens to an image surface of the optical system.

5. An optical system according to claim 3, wherein the stop side positive lens and the stop side negative lens satisfy the following condition:

$$1.00 \leq |(Nd_{sn} \times f_{sn})/(Nd_{sp} \times f_{sp})| \leq 2.00,$$

where $f_{sn}$ represents the focal length of the stop side negative lens in air, and $f_{sp}$ represents a focal length of the stop side positive lens in air.

6. An optical system according to claim 1, wherein:
the rear lens unit further includes a stop side negative lens, and
the stop side positive lens and the stop side negative lens form a cemented lens.

7. An optical system according to claim 1, wherein the diffractive optical element satisfies the following conditions:

$$0.01 \leq f/f_{doe} \leq 0.10; \text{ and}$$

$$0.10 \leq |h_{doe}/hb_{doe}| \leq 1.5,$$

where f represents a focal length of the whole optical system in an in-focus state on an object at infinity, $f_{doe}$ represents a focal length of a diffractive surface of the diffractive optical element, $h_{doe}$ represents a height of an axial paraxial ray entering the diffractive surface of the diffractive optical element in the front lens unit, which is measured at the diffractive surface from an optical axis of the optical system, and $hb_{doe}$ represents a height of a paraxial chief ray entering the diffractive surface, which is measured at the diffractive surface from the optical axis.

8. An optical apparatus comprising:
a body; and
an optical system housed in the body,
wherein the optical system comprises, in order from an object side to an image side:
a front lens unit;
an aperture stop; and
a rear lens unit,
wherein the front lens unit includes a diffractive optical element,
wherein the rear lens unit includes at least one positive lens,
wherein among the at least one positive lens, a stop side positive lens disposed closest to the aperture stop is formed of an optical material satisfying the following conditions:

$$1.55 \leq Nd_{sp} \leq 1.70;$$

$$30.0 \leq vd_{sp} \leq 50.0; \text{ and}$$

$$5.0 \times 10^{-4} \leq \Delta\theta dC_{sp} \leq 5.0 \times 10^{-3},$$

where $Nd_{sp}$ and $vd_{sp}$ respectively represent a refractive index and an Abbe number of the optical material of the stop side positive lens for a d-line, and $\Delta\theta dC_{sp}$ represents a value defined by:

$$\Delta\theta dC_{sp} = \theta dC_{sp} - (-0.17041 \times \theta gd_{sp} + 0.513577),$$

where $Ng_{sp}$, $NC_{sp}$ and $NF_{sp}$ respectively represent refractive indices of the optical material of the stop side positive lens for a g-line, a C-line and an F-line, and $\theta dC_{sp}$ and $\theta gd_{sp}$ are respectively defined by:

$$\theta dC_{sp} = (Nd_{sp} - NC_{sp})/(NF_{sp} - NC_{sp}); \text{ and}$$

$$\theta gd_{sp} = (Ng_{sp} - Nd_{sp})/(NF_{sp} - NC_{sp}), \text{ and}$$

wherein the stop side positive lens is disposed at a position satisfying the following condition:

$$10.0 \leq |h_{sp}/hb_{sp}| \leq 15.0,$$

where $h_{sp}$ represents a height of an axial paraxial ray entering the stop side positive lens, which is measured at an entrance surface of the stop side positive lens from an optical axis of the optical system, and $hb_{sp}$ represents a height of a paraxial chief ray entering the stop side positive lens, which is measured at the entrance surface of the stop side positive lens from the optical axis.

9. An optical system comprising, in order from an object side to an image side:
a front lens unit;
an aperture stop; and
a rear lens unit,
wherein the front lens unit includes a diffractive optical element,
wherein the rear lens unit includes at least one positive lens,
wherein among the at least one positive lens, a stop side positive lens disposed closest to the aperture stop is formed of an optical material satisfying the following conditions:

$$1.55 \leq Nd_{sp} \leq 1.70;$$

$$30.0 \leq vd_{sp} \leq 50.0; \text{ and}$$

$$5.0 \times 10^{-4} \leq \Delta\theta dC_{sp} \leq 5.0 \times 10^{-3},$$

where $Nd_{sp}$ and $vd_{sp}$ respectively represent a refractive index and an Abbe number of the optical material of the stop side positive lens for a d-line, and $\Delta\theta dC_{sp}$ represents a value defined by:

$$\Delta\theta dC_{sp} = \theta dC_{sp} - (-0.17041 \times \theta gd_{sp} + 0513577)$$

where $Ng_{sp}$, $NC_{sp}$ and $NF_{sp}$ respectively represent refractive indices of the optical material of the stop side positive lens for a g-line, a C-line and an F-line, and $\theta dC_{sp}$ and $\theta gd_{sp}$ are respectively defined by:

$$\theta dC_{sp} = (Nd_{sp} - NC_{sp})/(NF_{sp} - NC_{sp}); \text{ and}$$

$$\theta gd_{sp} = (Ng_{sp} - Nd_{sp})/(NF_{sp} - NC_{sp}), \text{ and}$$

wherein the diffractive optical element satisfies the following conditions:

$$0.01 \leq f/f_{doe} \leq 0.10; \text{ and}$$

$$0.10 \leq |h_{doe}/hb_{doe}| \leq 1.5,$$

where f represents a focal length of the whole optical system in an in-focus state on an object at infinity, $f_{doe}$ represents a focal length of a diffractive surface of the diffractive optical element, $h_{doe}$ represents a height of an axial paraxial ray entering the diffractive surface of the diffractive optical element in the front lens unit, which is measured at the diffractive surface from an optical axis of the optical system, and $hb_{doe}$ represents a height of a paraxial chief ray entering the diffractive surface, which is measured at the diffractive surface from the optical axis.

10. An optical apparatus comprising:

a body; and an optical system housed in the body, wherein the optical system comprises, in order from an object side to an image side:

a front lens unit;

an aperture stop; and a rear lens unit, wherein the front lens unit includes a diffractive optical element, wherein the rear lens unit includes at least one positive lens, wherein among the at least one positive lens, a stop side positive lens disposed closest to the aperture stop is formed of an optical material satisfying the following conditions:

$1.55 \leq Nd_{sp} \leq 1.70$;

$30.0 \leq vd_{sp} \leq 50.0$; and $5.0 \times 10^{-4} \leq \Delta\theta dC_{sp} \leq 5.0 \times 10^{-3}$, where $Nd_{sp}$ and $vd_{sp}$ respectively represent a refractive index and an Abbe number of the optical material of the stop side positive lens for a d-line, and $\Delta\theta C_{sp}$ represents a value defined by:

$\Delta\theta dC_{sp} = \theta dC_{sp} - (-0.17041 \times \theta gd_{sp} + 0.513577)$, where $Ng_{sp}$, $NC_{sp}$ and $NF_{sp}$ respectively represent refractive indices of the optical material of the stop side positive lens for a g-line, a C-line and an F-line, and $\theta dC_{sp}$ and $\theta gd_{sp}$ are respectively defined by:

$\theta dC_{sp} = (Nd_{sp} - NC_{sp})/(NF_{sp} - NC_{sp})$; and $\theta gd_{sp} = (Ng_{sp} - Nd_{sp})/(NF_{sp} - NC_{sp})$, and wherein the diffractive optical element satisfies the following conditions:

$0.01 \leq f/f_{doe} \leq 0.10$; and $0.10 \leq |h_{doe}/hb_{doe}| \leq 1.5$, where f represents a focal length of the whole optical system in an in-focus state on an object at infinity, $f_{doe}$ represents a focal length of a diffractive surface of the diffractive optical element, $h_{doe}$ represents a height of an axial paraxial ray entering the diffractive surface of the diffractive optical element in the front lens unit, which is measured at the diffractive surface from an optical axis of the optical system, and $hb_{doe}$ represents a height of a paraxial chief ray entering the diffractive surface, which is measured at the diffractive surface from the optical axis.

\* \* \* \* \*